(12) United States Patent
Blake et al.

(10) Patent No.: US 9,869,299 B2
(45) Date of Patent: *Jan. 16, 2018

(54) WIND ENERGY SYSTEM AND METHOD FOR USING SAME

(71) Applicant: LGT Advanced Technology Limited, Edinburgh (GB)

(72) Inventors: Timothy Blake, Worcester (GB); George Harold Ryton, Par (GB); Hassan Mansir, Maidenhead (GB); Nicholas James Hemingway, Pencader (GB)

( * ) Notice: Subject to any disclaimer, the term of this patent is extended or adjusted under 35 U.S.C. 154(b) by 93 days.

This patent is subject to a terminal disclaimer.

(21) Appl. No.: 14/941,626

(22) Filed: Nov. 15, 2015

(65) Prior Publication Data

US 2016/0076519 A1 Mar. 17, 2016

Related U.S. Application Data

(63) Continuation-in-part of application No. 13/871,775, filed on Apr. 26, 2013, now Pat. No. 9,261,073, and
(Continued)

(51) Int. Cl.
*F03D 7/04* (2006.01)
*F03D 1/02* (2006.01)
(Continued)

(52) U.S. Cl.
CPC .............. *F03D 7/047* (2013.01); *C02F 1/463* (2013.01); *C25B 1/04* (2013.01); *C25C 1/00* (2013.01); *F03D 1/025* (2013.01); *F03D 1/04* (2013.01); *F03D 1/065* (2013.01); *F03D 1/0625* (2013.01); *F03D 7/0204* (2013.01); *F03D 9/25* (2016.05); *F03D 9/28* (2016.05); *F03D 13/20* (2016.05); *F03D 15/00* (2016.05); *F03D 15/20* (2016.05); *F03D 17/00* (2016.05); *F03D 80/82* (2016.05); *F03D 80/88* (2016.05); *F05B 2240/12* (2013.01); *F05B 2240/133* (2013.01); *F05B 2240/9151* (2013.01); *F05B 2260/404* (2013.01); *F05B 2260/406* (2013.01); *F05B 2260/4031* (2013.01); *F05B 2260/42* (2013.01); *Y02E 10/721* (2013.01); *Y02E 10/722* (2013.01);
(Continued)

(58) Field of Classification Search
CPC .......... F03D 1/04; F03D 11/02; F03D 11/028; F03D 1/0625; F03D 7/0204
USPC ............................................. 60/398; 416/128
See application file for complete search history.

(56) References Cited

U.S. PATENT DOCUMENTS

| 3,952,723 A | 4/1976 | Browning |
| 4,008,006 A | 2/1977 | Bea |

(Continued)

*Primary Examiner* — Michael Leslie
*Assistant Examiner* — Daniel Collins
(74) *Attorney, Agent, or Firm* — Antoinette M. Tease

(57) ABSTRACT

A wind energy system with a wind turbine having a cowling surrounded by a diffuser, a plurality of inner rotor blades located inside of the cowling that rotate about an inner rotor hub, a plurality of outer rotor blades positioned between the diffuser and the cowling that rotate in an opposite direction to that of the plurality of inner rotor blades, a drive mechanism located within the inner rotor hub, a dynamic telescopic tower with a height that adjusts automatically by motors controlled by a controller based on input from sensors located in the dynamic telescopic tower and on the wind turbine, and a tower support that connects the wind turbine to the dynamic telescopic tower.

44 Claims, 26 Drawing Sheets

Related U.S. Application Data a continuation-in-part of application No. 13/526,407, filed on Jun. 18, 2012, now Pat. No. 9,217,412.

(51) Int. Cl.

| | | |
|---|---|---|
| *F03D 1/04* | (2006.01) | |
| *F03D 1/06* | (2006.01) | |
| *F03D 7/02* | (2006.01) | |
| *C02F 1/463* | (2006.01) | |
| *C25B 1/04* | (2006.01) | |
| *C25C 1/00* | (2006.01) | |
| *F03D 80/80* | (2016.01) | |
| *F03D 17/00* | (2016.01) | |
| *F03D 15/00* | (2016.01) | |
| *F03D 15/20* | (2016.01) | |
| *F03D 13/20* | (2016.01) | |
| *F03D 9/25* | (2016.01) | |
| *F03D 9/28* | (2016.01) | |

(52) U.S. Cl.
CPC ........... *Y02E 10/723* (2013.01); *Y02E 10/728* (2013.01); *Y02E 60/366* (2013.01); *Y02P 20/133* (2015.11); *Y02W 10/33* (2015.05); *Y02W 10/37* (2015.05)

(56) References Cited

U.S. PATENT DOCUMENTS

| | | | |
|---|---|---|---|
| 4,058,979 A | 11/1977 | Germain | |
| 4,274,010 A | 6/1981 | Lawson-Tancred | |
| 4,366,779 A | 1/1983 | Knecht | |
| 4,447,738 A | 7/1984 | Allison | |
| 4,496,846 A | 1/1985 | Parkins | |
| 4,496,847 A | 1/1985 | Parkins | |
| 4,498,017 A | 2/1985 | Parkins | |
| 4,648,801 A | 3/1987 | Wilson | |
| 7,183,664 B2 | 2/2007 | McClintic | |
| 7,418,820 B2 | 9/2008 | Harvey et al. | |
| 7,436,086 B2 | 10/2008 | McClintic | |
| 7,569,943 B2 | 8/2009 | Kovach et al. | |
| 7,656,055 B2 | 2/2010 | Torres et al. | |
| 7,863,767 B2 | 1/2011 | Chapple et al. | |
| 7,877,992 B2 | 2/2011 | Chen | |
| 7,932,620 B2 | 4/2011 | Plant, Jr. | |
| 7,944,078 B1 | 5/2011 | Wang | |
| 2002/0144503 A1 | 10/2002 | Merswolke et al. | |
| 2002/0144504 A1 | 10/2002 | Merswolke et al. | |
| 2006/0260312 A1 | 11/2003 | Ingersoll | |
| 2005/0155346 A1 | 7/2005 | Nikolaus | |
| 2006/0210406 A1 | 9/2006 | Harvey et al. | |
| 2006/0260311 A1 | 11/2006 | Ingersoll | |
| 2006/0266034 A1 | 11/2006 | Ingersoll | |
| 2006/0266035 A1 | 11/2006 | Ingersoll et al. | |
| 2006/0266036 A1 | 11/2006 | Ingersoll | |
| 2007/0024058 A1 | 2/2007 | McClintic | |
| 2007/0132247 A1 | 6/2007 | Galayda et al. | |
| 2007/0138798 A1 | 6/2007 | McClintic | |
| 2008/0296897 A1 | 12/2008 | Kovach et al. | |
| 2009/0021012 A1 | 1/2009 | Stull et al. | |
| 2009/0058095 A1 | 3/2009 | McClintic | |
| 2009/0129953 A1 | 5/2009 | Andersen | |
| 2009/0140522 A1 | 6/2009 | Chapple et al. | |
| 2009/0230688 A1 | 9/2009 | Torres et al. | |
| 2009/0273186 A1 | 11/2009 | Plant, Jr. et al. | |
| 2009/0293469 A1 | 12/2009 | Chen | |
| 2010/0032959 A1 | 2/2010 | Nies | |
| 2010/0040470 A1 | 2/2010 | Nies et al. | |
| 2010/0056315 A1 | 3/2010 | Scholte-Wassink | |
| 2010/0276935 A1 | 11/2010 | Dehlsen et al. | |
| 2010/0320767 A1 | 12/2010 | Knollman | |
| 2010/0320770 A1 | 12/2010 | Dahlhaug | |
| 2010/0320772 A1 | 12/2010 | Efratyi | |
| 2011/0120108 A1 | 5/2011 | Garmong | |

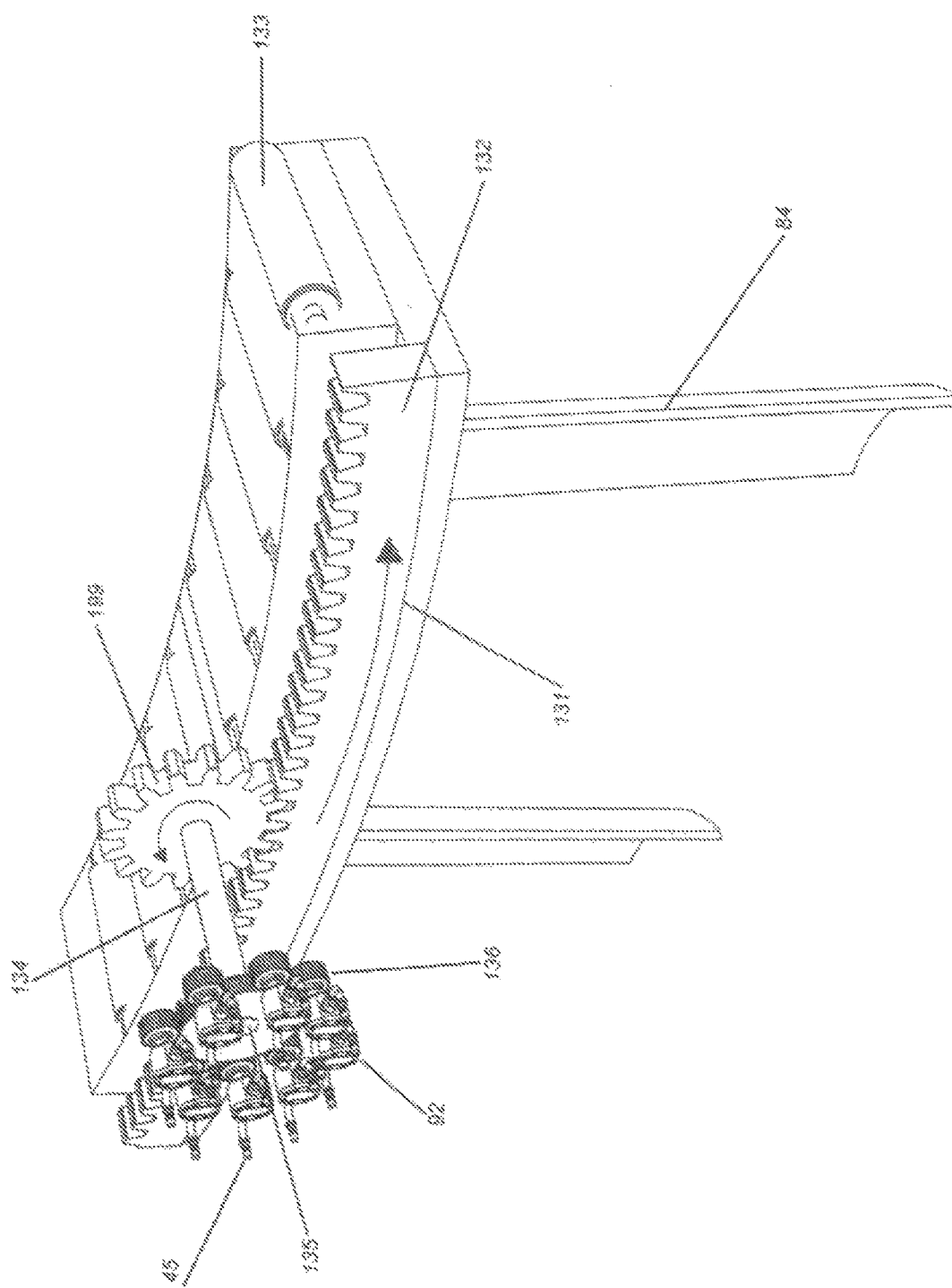

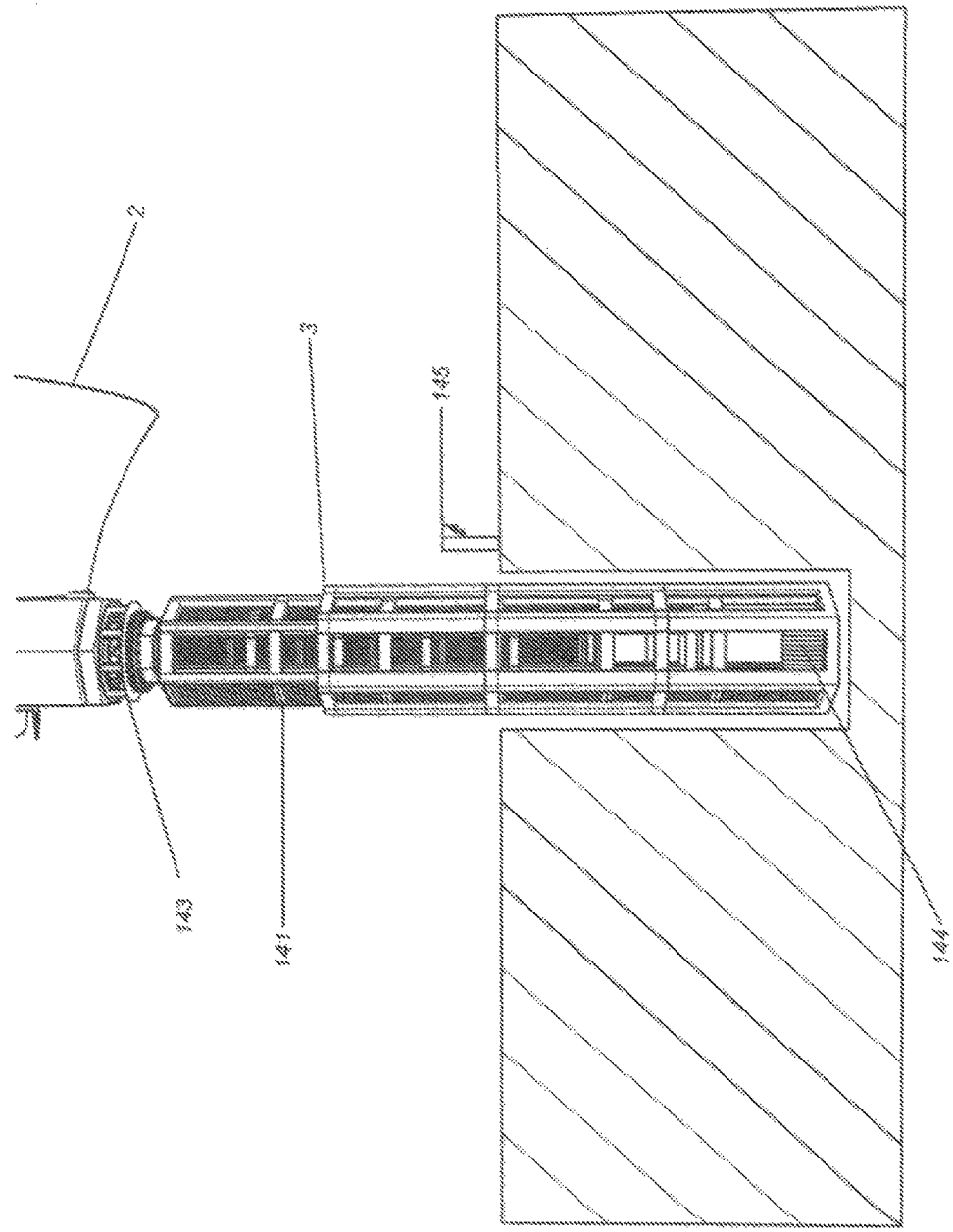

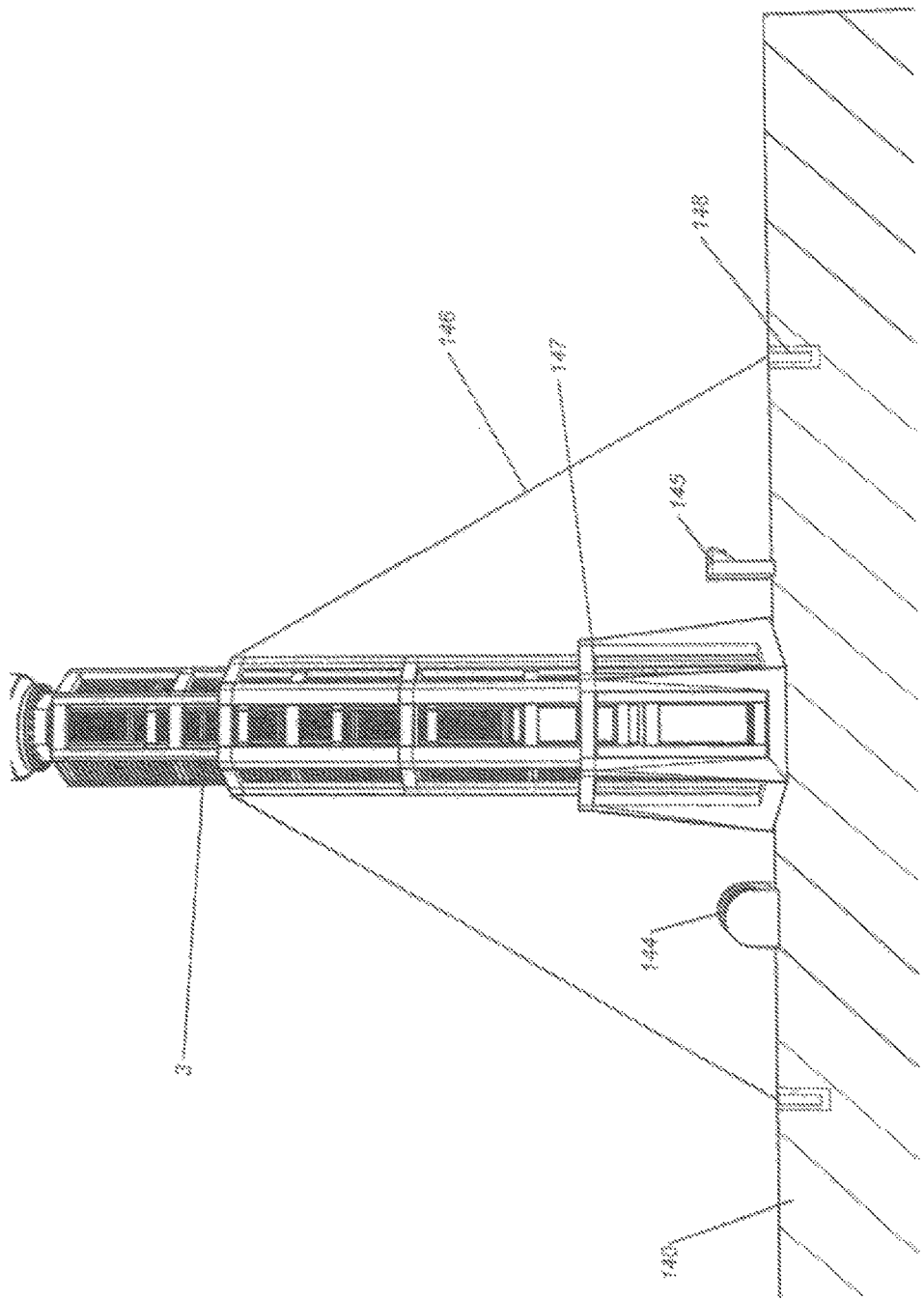

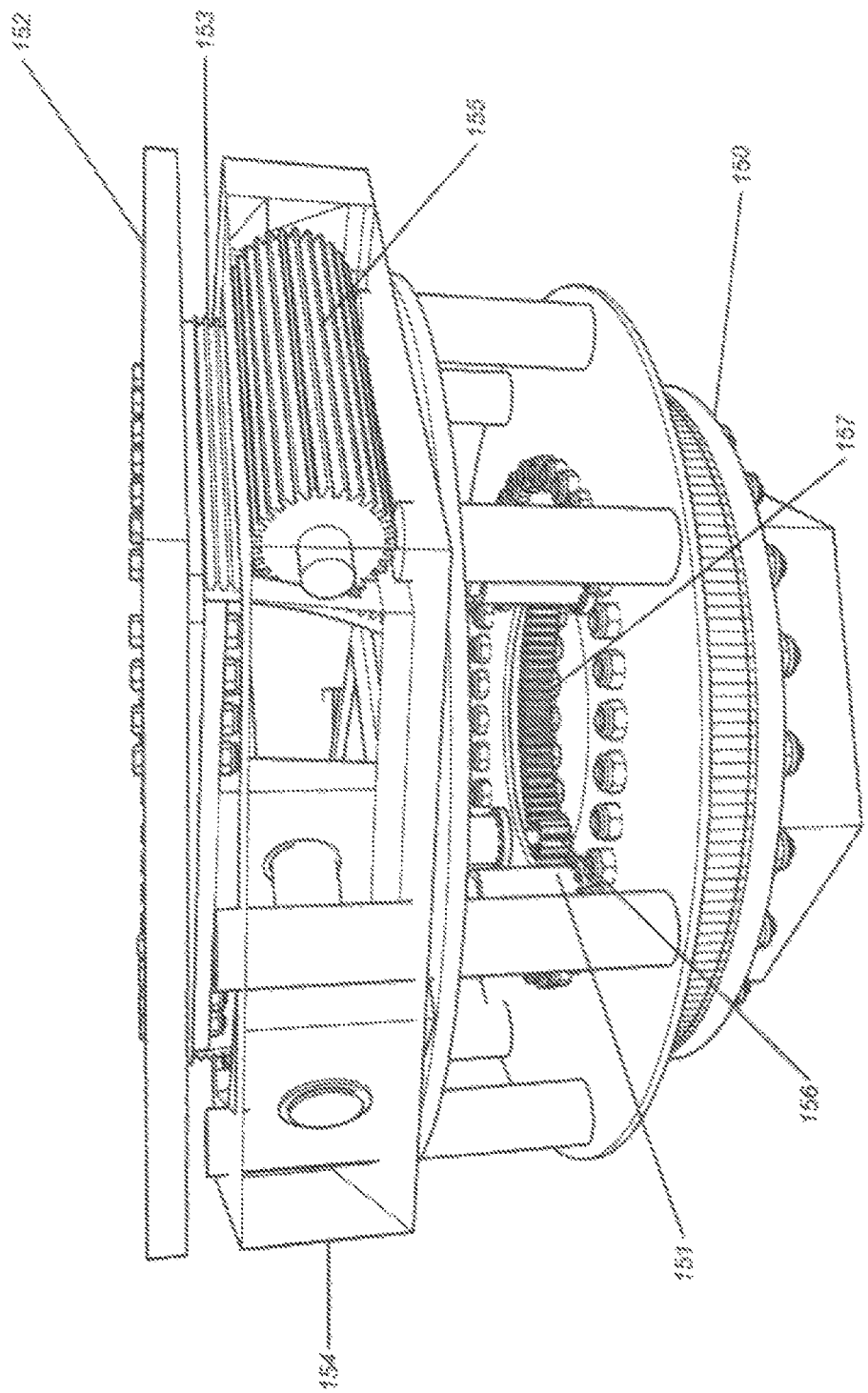

WIND ENERGY SYSTEM AND METHOD FOR USING SAME

CROSS-REFERENCE TO RELATED APPLICATION

This application is a continuation-in-part of U.S. patent application Ser. No. 13/526,407 filed on Jun. 18, 2012, and U.S. patent application Ser. No. 13/871,775 filed on Apr. 26, 2013. The former application claims priority back to U.S. Patent Application No. 61/639,952 filed on Apr. 29, 2012.

BACKGROUND OF THE INVENTION

1. Field of the Invention

The present invention relates generally to the field of wind energy, and more specifically, to a wind energy system and a method for using the wind energy system to store energy, mine metals, produce hydrogen and decontaminate water.

2. Description of the Related Art

The majority of the existing wind turbines use horizontal axis turbines. These turbines drive an electrical machine typically through a high ratio gearbox. The extracted power is processed fully, as in the case of permanent magnet generators, or partially by means of slip recovery, as in the case of doubly fed induction generators. In both cases, the electrical machine, associated gearbox, coupling and clutch are located in the nacelle on top of the tower. This has the consequence of requiring a larger tower and associated structure.

In a conventional wind farm energy system, the electrical energy is generated by a cascade of units so that if one of these units fails, operation is interrupted immediately. In addition, the cost and complexity of a maintenance action are significant due to the fact that the gearbox and generator are on the top of a fixed tower that cannot be lowered. Furthermore, the electrical power generated by the conventional wind turbine fluctuates with time as a function of the wind prevailing condition. In some instances, when the wind velocity falls below or rises above certain thresholds, energy production ceases. Because this availability of energy is fluctuating, it cannot be relied upon for sustained energy supply.

The present invention overcomes these and many other limitations of conventional wind energy systems, and it also provides significant advantages in terms of size, cost and ease of installation. Structural disadvantages of conventional wind energy systems include, but are not limited to, the following: (i) the turbines only turn to face the prevailing wind on a horizontal axis; (ii) they do not include a mechanism for reducing driveline mechanical drag relating to available wind speed; (iii) they do not provide a system for absorbing fluctuations in wind power so as to provide a constant level electrical power output; (iv) the rotor blades tend to vibrate excessively and suffer from asymmetrical torque effect, which increases driveline maintenance and limits placement options for the turbines; (v) they do not include an integrated energy storage system, which enables a controlled energy output without the loss of energy; (vi) the single generator and gearbox located in the nacelle are very heavy and difficult to maintain; (vii) the coupled driveline does not allow the generators to be driven independently of the rotor system; (viii) there is no hybrid power option for constant energy supply; (viii) they do not incorporate load sensors that automatically adjust the tower height based on load stress or wind speed, thereby avoiding the need to turn rotors off and cease energy production; and (ix) the towers are not able to be lowered for maintenance. In addition to solving all of the above problems, the present invention incorporates a bat deterrence system that is not found in any existing wind energy systems.

Examples of patented prior art wind energy systems (or inventions relating to wind energy systems) include: U.S. Pat. No. 3,952,723 (Browning, 1976) entitled "Windmills"; U.S. Pat. No. 4,058,979 (Germain, 1977) entitled "Energy Storage and Conversion Technique and Apparatus"; U.S. Pat. No. 4,274,010 (Lawson-Tancred, 1981) entitled "Electric Power Generation"; U.S. Pat. No. 4,366,779 (Knecht, 1983) entitled "Wind Driven Heating System"; U.S. Pat. No. 4,447,738 (Allison, 1984) entitled "Wind Power Electrical Generator System"; U.S. Pat. No. 4,496,846 (Parkins, 1985) entitled "Power Generation From Wind"; U.S. Pat. No. 4,496,847 (Parkins, 1985) entitled "Power Generation From Wind"; U.S. Pat. No. 4,498,017 (Parkins, 1985) entitled "Generating Power From Wind"; U.S. Pat. No. 4,648,801 (Wilson, 1987) entitled "Wind Turbines"; U.S. Pat. No. 7,183,664 (McClintic, 2007) entitled "Methods and Apparatus for Advanced Wind Turbine Design"; U.S. Pat. No. 7,418,820 (Harvey et al., 2008) entitled "Wind Turbine With Hydraulic Transmission"; U.S. Pat. No. 7,436,086 (McClintic, 2008) entitled "Methods and Apparatus for Advanced Wind Turbine Design"; U.S. Pat. No. 7,569,943 (Kovach et al., 2009) entitled "Variable Speed Wind Turbine Drive and Control System"; U.S. Pat. No. 7,656,055 (Torres et al., 2010) entitled "Hydro-Wind Power Generating Turbine System and Retrofitting Method"; U.S. Pat. No. 7,863,767 (Chapple et al., 2011) entitled "Turbine Drive Electric Power Production System and a Method for Control Thereof"; U.S. Pat. No. 7,877,992 (Chen, 2011) entitled "Hydraulic Power Generation System Driven by Compression Air Produced by Fluid"; U.S. Pat. No. 7,932,620 (Plant, Jr., 2011) entitled "Windmill Utilizing a Fluid Driven Pump"; and U.S. Pat. No. 7,944,078 (Wang, 2011) entitled "Wind Turbine With Hydro-Transmission."

BRIEF SUMMARY OF THE INVENTION

The present invention is a wind energy system comprising: a wind turbine comprising a cowling surrounded by a diffuser; a plurality of inner rotor blades located inside of the cowling, wherein the plurality of inner rotor blades rotates about an inner rotor hub; a plurality of outer rotor blades positioned between the diffuser and the cowling, wherein the plurality of outer rotor blades rotate in an opposite direction to that of the plurality of inner rotor blades; a drive mechanism located within the inner rotor hub; a dynamic telescopic tower with a height that adjusts automatically by motors controlled by a controller based on input from sensors located in the dynamic telescopic tower and on the wind turbine; and a tower support that connects the wind turbine to the dynamic telescopic tower. In a preferred embodiment, the invention further comprises a plurality of air guides located inside of the cowling and in front of the inner rotor blades. Preferably, the outer rotors rotate around the cowling on roller bearings.

In a preferred embodiment, the invention further comprises two horizontal wind speed sensors and two vertical wind speed sensors situated on an outer surface of the cowling forward of the diffuser, wherein the two horizontal wind speed sensors are situated opposite one another on a horizontal plane, and the two vertical wind speed sensors are situated opposite one another on a vertical plane, wherein the two horizontal wind speed sensors are situated on an adjacent side of the cowling relative to the two vertical wind speed sensors, wherein each of the horizontal wind speed sensors and each of the vertical wind speed sensors records a wind speed, wherein a computer control unit compares the wind speeds recorded by the two horizontal wind speed sensors and turns the turbine via a three-dimensional yaw control toward the horizontal wind speed sensor that records a lower wind speed than the other horizontal wind speed sensor, and wherein the computer control unit compares the wind speeds recorded by the two vertical wind speed sensors and turns the turbine via a three-dimensional yaw control toward the vertical wind speed sensor that records a lower wind speed than the other vertical wind speed sensor.

In a preferred embodiment, the cowling and diffuser each comprises an exhaust with an inner diameter and an inlet with an inner diameter, and wherein the inner diameter of the exhaust of the cowling is greater than the inner diameter of the inlet of the cowling, and the inner diameter of the exhaust of the diffuser is greater than the inner diameter of the inlet of the diffuser. Preferably, the cowling and diffuser each comprises a rear edge, wherein the rear edges of the cowling and diffuser are aligned vertically, wherein the cowling extends a certain length from the rear edge of the cowling to a front edge of the cowling, wherein the diffuser extends a certain length from the rear edge of the diffuser to a front edge of the diffuser, and wherein the certain length of the diffuser is equal to approximately half the certain length of the cowling.

In a preferred embodiment, the inner rotor blades are connected to a first drive shaft, wherein the first drive shaft is connected to the inner rotor hub, wherein the first drive shaft rotates a first gear, wherein the first gear is connected to a plurality of first variable displacement hydraulic pumps that pump a pressurized liquid through a high-pressure hydraulic circuit, wherein each of the plurality of first variable displacement hydraulic pumps is connected to the first gear by a first electromagnetic coupling, and wherein the first electromagnetic coupling is controlled by a power control unit that processes information from a speed sensor located on the first drive shaft. Preferably, the inner rotor blades are connected to a first drive shaft, wherein the first drive shaft is connected to the inner rotor hub, wherein the first drive shaft rotates a first gear, wherein the first gear is connected to a plurality of first variable displacement hydraulic pumps that pump a pressurized liquid through a high-pressure hydraulic circuit, wherein each of the plurality of first variable displacement hydraulic pumps is connected to the first gear by a first electromagnetic coupling, and wherein the first electromagnetic coupling is controlled by a power control unit that processes information from a torque sensor located on the first drive shaft.

In a preferred embodiment, the invention further comprises a ring gear that rotates when the plurality of outer rotor blades rotates, wherein the ring gear engages an outer rotor drive gear, wherein the outer rotor drive gear is connected to a second drive shaft, wherein the second drive shaft is connected to a second gear, wherein the second gear drives a plurality of second electromagnetic couplings, and wherein each of the plurality of second electromagnetic couplings is connected to a second variable displacement hydraulic pump. Preferably, the sensors include sensors that monitor rotational speed of the first gear and second gear, wherein the dynamic telescopic tower positions the wind turbine at a height, wherein the dynamic telescopic tower comprises one or more load sensors, and wherein a computer control unit automatically adjusts the height of the wind turbine based on data from the one or more sensors that monitor the rotational speed of the first gear and second gear and the one or more load sensors in the dynamic telescopic tower.

In a preferred embodiment, the inner rotor blades are connected to a first drive shaft, wherein the first drive shaft is connected to the inner rotor hub, wherein the first drive shaft rotates a first gear, wherein the first gear is connected to a plurality of first air compressors that pump a pressurized fluid through a high-pressure pneumatic circuit, wherein each of the plurality of first air compressors is connected to the first gear by a first electromagnetic coupling, and wherein the first electromagnetic coupling is controlled by a power control unit that processes information from a speed sensor located on the first drive shaft. Preferably, the inner rotor blades are connected to a first drive shaft, wherein the first drive shaft is connected to the inner rotor hub, wherein the first drive shaft rotates a first gear, wherein the first gear is connected to a plurality of first air compressors that pump a pressurized fluid through a high-pressure pneumatic circuit, wherein each of the plurality of first air compressors is connected to the first gear by a first electromagnetic coupling, and wherein the first electromagnetic coupling is controlled by a power control unit that processes information from a torque sensor located on the first drive shaft.

In a preferred embodiment, the invention further comprises a ring gear that rotates when the plurality of outer rotor blades rotates, wherein the ring gear engages an outer rotor drive gear, wherein the outer rotor drive gear is connected to a second drive shaft, wherein the second drive shaft is connected to a second gear, wherein the second gear drives a plurality of second electromagnetic couplings, and wherein each of the plurality of second electromagnetic couplings is connected to a second air compressor. Preferably, the sensors include sensors that monitor rotational speed of the first gear and second gear, wherein the dynamic telescopic tower positions the wind turbine at a height, wherein the dynamic telescopic tower comprises one or more load sensors, and wherein a computer control unit automatically adjusts the height of the wind turbine based on data from the one or more sensors that monitor the rotational speed of the first gear and second gear and the one or more load sensors in the dynamic telescopic tower.

In a preferred embodiment, energy is generated by wind with a mean direction, and wherein the dynamic telescopic tower comprises an integrated three-dimensional yaw control that aligns the wind turbine with the mean direction of the wind. Preferably, the three-dimensional yaw control comprises a plurality of yaw horizontal drive motors attached to a horizontal yaw ring gear and a plurality of vertical yaw drives connected to a drive rail on a yaw control platform. The invention optionally further comprises a bat deterrence system, wherein the bat deterrence system comprises a microphone, a pre-amplifier, a low-pass filter, an analog-to-digital converter, a digital sound processor, a digital-to-analog converter, an amplifier, and a speaker, and wherein the bat deterrence system is attached to the wind turbine. Alternately, the invention optionally further comprises a bat deterrence system, wherein the bat deterrence system comprises a microphone, a pre-amplifier, a low-pass filter, an analog-to-digital converter, a digital sound processor, a digital-to-analog converter, an amplifier, and a speaker, and wherein the bat deterrence system is attached to the dynamic telescopic tower.

In a preferred embodiment, the invention further comprises one or more hydraulic accumulators that compress an inert gas and use the compressed inert gas to force the pressurized liquid through a controlled release valve and through high-pressure pipes to drive a hybrid variable displacement hydraulic pump. Preferably, the hybrid variable displacement pump drives one or more ground-based multiple permanent magnet electrical generators to create electricity. Each of the first variable displacement hydraulic pumps preferably comprises a solenoid-operated bypass valve that diverts fluid flow through the first variable displacement hydraulic pump when the first variable displacement pump is not in use.

In a preferred embodiment, the power control unit monitors data comprising wind speed, drive shaft speed and hydraulic pressure via electrical sensors and processes the data to determine how many first variable displacement hydraulic pumps need to be activated at any moment in time. Preferably, the power control unit monitors data comprising wind speed, drive shaft speed and hydraulic pressure via electrical sensors and processes the data to determine how many second variable displacement hydraulic pumps need to be activated at any moment in time.

In a preferred embodiment, when wind speed reaches a certain velocity, the dynamic telescopic tower is automatically lowered to a safe operating height without the inner and outer rotor blades being switched off. Preferably, rotational speed of the rotor blades changes as wind velocity changes. The invention preferably further comprises hydraulic accumulators that absorb fluctuating energy levels from wind, store excess energy, and supply a constant and controlled output to drive a plurality of permanent magnetic generators. The plurality of permanent magnetic generators are preferably housed in modular generator clusters.

In a preferred embodiment, the modular generator clusters switch on and off individually as and when demand is required. Preferably, each permanent magnetic generator is driven by a generator drive gear, and wherein the generator drive gear turns a permanent magnetic generator coupling that spins a drive in the permanent magnetic generator without a direct mechanical linkage. Each permanent magnetic generator preferably comprises a water jacket that cools the permanent magnetic generator by passing a cool liquid around heat-producing mechanical components. In a preferred embodiment, a computer control unit monitors hydraulic pressure at a hydraulic motor that drives the generator drive gear, calculates how many permanent magnetic generators to activate to generate electricity, and switches individual permanent magnetic generator electromagnetic couplings on or off depending on available hydraulic pressure.

The present invention is also a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotates in the same direction as the plurality of first inner rotor blades; a plurality of outer rotor blades positioned between the diffuser and the cowling, wherein the plurality of outer rotor blades rotate in an opposite direction to that of the plurality of first and second inner rotor blades; a drive mechanism located within the inner rotor hub; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

The present invention is also a method of mining metals comprising: using the wind energy system described above to generate energy; passing a slurry through an electrochemical ion transfer desalination process to remove precious metals from the slurry and produce hydrogen gas and oxygen; producing potable water by removing metals and contaminants from the slurry; and storing the hydrogen gas and oxygen produced during the desalination process in pressurized containers.

In an alternate embodiment, the present invention is a wind energy system comprising: a wind turbine comprising a cowling surrounded by a diffuser; a plurality of inner rotor blades located inside of the cowling, wherein the plurality of inner rotor blades rotates about an inner rotor hub; a plurality of outer rotor blades positioned between the diffuser and the cowling, wherein the plurality of outer rotor blades rotate in an opposite direction to that of the plurality of inner rotor blades; a drive mechanism located within the inner rotor hub; a dynamic telescopic tower with a height that adjusts automatically by motors controlled by a controller based on input from sensors located in the dynamic telescopic tower and on the wind turbine; a tower support that connects the wind turbine to the dynamic telescopic tower; and one or more hydraulic accumulators that compress a gas and use the compressed gas to force a pressurized liquid through a controlled release valve and through high-pressure pipes to drive a hybrid variable displacement hydraulic pump.

In another alternate embodiment, the present invention is a wind energy system comprising: a wind turbine comprising a cowling surrounded by a diffuser; a plurality of first inner rotor blades located inside of the cowling, wherein the plurality of first inner rotor blades rotates about a first inner rotor hub; a plurality of second inner rotor blades located inside of the cowling and behind the plurality of first inner rotor blades, wherein the plurality of second inner rotor blades rotate in an opposite direction to that of the plurality of first inner rotor blades; a plurality of outer rotor blades positioned between the diffuser and the cowling, wherein the plurality of outer rotor blades rotate in an opposite direction to that of the plurality of inner rotor blades; a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotate in an opposite direction to that of the plurality of first inner rotor blades; a plurality of outer rotor blades positioned between the diffuser and the cowling, wherein the plurality of outer rotor blades rotates in the same direction as the second inner rotor blades; a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of inner rotor blades located inside of the cowling, wherein the plurality of inner rotor blades rotates about a first inner rotor hub; a drive mechanism located within the inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotate in an opposite direction to that of the plurality of first inner rotor blades; a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotates in the same direction as the plurality of first inner rotor blades; a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of first inner rotor blades rotates about a first inner rotor hub; a plurality of second inner rotor blades located inside of the cowling and behind the plurality of first inner rotor blades, wherein the plurality of second inner rotor blades rotate in an opposite direction to that of the plurality of first inner rotor blades; a plurality of outer rotor blades positioned between the diffuser and the cowling, wherein the plurality of outer rotor blades rotate in an opposite direction to that of the plurality of inner rotor blades; a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotate in an opposite direction to that of the plurality of first inner rotor blades; a plurality of outer rotor blades positioned between the diffuser and the cowling, wherein the plurality of outer rotor blades rotates in the same direction as the second inner rotor blades; a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of inner rotor blades located inside of the cowling, wherein the plurality of inner rotor blades rotates about a first inner rotor hub; a drive mechanism located within the inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotate in an opposite direction to that of the plurality of first inner rotor blades; a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

In another alternate embodiment, the present invention is a wind energy system comprising: a wind turbine comprising a cowling surrounded by a diffuser; a plurality of first inner rotor blades located inside of the cowling, wherein the plurality of inner rotor blades rotates about a first inner rotor hub; a plurality of second inner rotor blades located inside of the cowling and behind the plurality of first inner rotor blades, wherein the plurality of second inner rotor blades rotates in the same direction as the plurality of first inner rotor blades; a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure; a dynamic telescopic tower with a height that adjusts automatically by motors controlled by a controller based on input from sensors located in the dynamic telescopic tower and on the wind turbine; and a tower support that connects the wind turbine to the dynamic telescopic tower.

BRIEF DESCRIPTION OF THE DRAWINGS

FIG. 12 is a perspective view of a section of the outer rotor system of the present invention.

FIG. 15 is a detail perspective view of the below-ground installation of the dynamic tower in the lowered position shown with the turbine nacelle yaw control and hydraulic pipe winding device located inside the base of the tower.

FIG. 16 is a front perspective view of the dynamic tower on surface installation with cable support.

FIG. 17A a perspective view of the three-dimensional yaw system of the present invention.

REFERENCE NUMBERS

Figure 1:
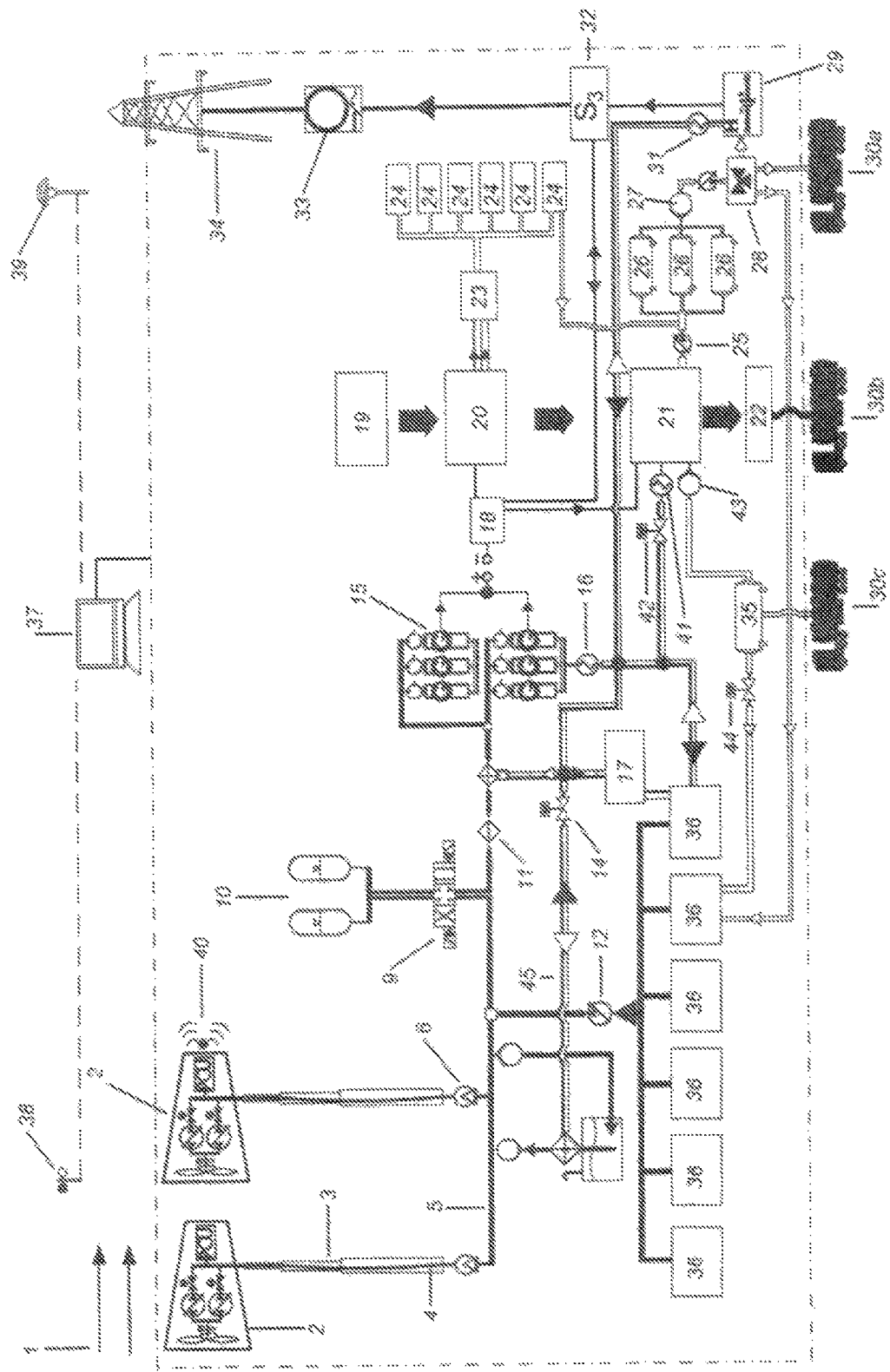
FIG. 1 is a schematic diagram of the wind energy system of the present invention.

1 Wind energy
2 Wind turbine
3 Dynamic tower
4 High-pressure hose
5 Hydraulic pipe
6 High-pressure hose reel
9 Electrohydraulic servo valve
10 Hydraulic accumulator
12 Hybrid variable displacement hydraulic pump
15 Electrical permanent magnet generator
16 First heat exchanger
17 Steam generator
18 Electrical junction control switch
19 Water-based slurry
20 Water desalination system
21 Hydrogen electrolyzer
22 Desalinated water
23 Dryer
24 Compound
26 First pressurized storage container
27 Non-return valve
28 Three-way valve
29 Hydrogen fuel cell
30a Tanker
30b Commercial shipper
31 Second heat exchanger
32 Three-way electrical switch
33 DC to AC converter
34 Power transmission grid
35 Second pressurized storage container
36 Hybrid energy system
37 Computer control unit (CCU)
38 Wind speed
41 Third heat exchanger
45 Piping
52 Two-way pipe
53 Hybrid-driven air compressor
54 Hybrid air compressor heat exchanger
55 High-pressure air line
56 Air dryer
57 First air dividing valve
58 Compressed air storage vessel
59 Air release valve
60 One-way valve
61 Second dividing valve
62 High-speed pneumatic motor
80 Cowling
81 Diffuser
82 Air guide
83 Inner rotor blade
84 Outer rotor blade
85 Inner rotor hub
86 Tower support
87 Structural stave
88 Wind speed sensor (horizontal plane)
89 Wind speed sensor (vertical plane)
90 First gear
92 Variable displacement hydraulic pump
93 Torque/speed sensor
94a First electronic shutoff valve
94b Second electronic shutoff valve
96a First electromagnetic coupling
96b Second electromagnetic coupling
97 Pressure release valve
98 Hydraulic actuator
99 Power control unit (PCU)
100 Hydraulic line
110 Rotor hub
111 Rotor blade attachment base
112 Disc brake
113 First drive shaft
117 Tubular space frame
120 First bearing
121 Second bearing
131 Outer rotor assembly
132 Ring gear
133 Roller bearing
134 Second drive shaft
135 Second gear
136 Third electromagnetic coupling
140 Ground
141 Drive rail
142 Section (of dynamic tower)
143 Yaw control
144 Hydraulic hose reel
145 Service panel
146 Steel cable
147 Platform
150 Yaw bearing
151 Yaw horizontal drive motor
152 Yaw control platform
153 Yaw tilt drive rail
154 Vertical yaw frame
155 Vertical yaw drive
156 Horizontal yaw drive gear
157 Horizontal yaw ring gear
160 Dynamic tower electromagnetic drive
162 DC motor
163 Bevel gear
164 Dynamic tower roller guide
171 Generator drive gear
172 PMG electromagnetic coupling
173 Electrical cable
174 Outlet connector
175 Inlet connector
176 Fixing plate
180 Generator cluster drive gear
181 Hydraulic motor
182 Lifting hook
185 Generator cluster frame
186 Retaining bracket 191 Front area (of turbine)
192 Rear area (of turbine)
193 Wind turbine tilted down
194 Wind turbine tilted up
195 Rear inner rotor blade
196 Cowling outer surface
197 Cowling inner surface
198 Diffuser leading edge
199 Outer rotor drive gear
201 Microphone
202 Pre-amplifier
203 Low-pass filter
204 Digital signal
205 Digital sound processor
206 Digital analog converter
207 Amplifier
208 Speaker

DETAILED DESCRIPTION OF INVENTION

FIG. 1 is a schematic diagram of the wind energy system of the present invention. Specifically, FIG. 1 shows the process by which the sustainable energy system (SES) of the present invention extracts energy from wind through a decoupled multiple rotor ducted diffuser wind turbine by converting the energy from the prevailing wind into rotational energy of the rotor blades. The rotational energy captured by the rotor blades drives a series of hydraulic pumps that transfer the rotational energy into a pressurized fluid. The pressurized fluid transmits, balances and stores the captured energy in hydraulic accumulators, which retain the energy under pressure that can then be released through valves in a controlled manner.

The fluid pressure is maintained in the accumulators by a membrane bladder (diaphragm), steel piston or steel bellows. Each of these options uses the hydraulic pressure to force the bladder, piston or bellows against a gas, which compresses under the pressure applied. The pressurized gas is used to force the pressurized fluid out through a controlled release valve and through high-pressure pipes to drive a hydraulic motor, which in turn drives the ground-based multiple permanent magnet electrical generators (PMGs) to create electricity. The SES uses high- and low-air pressure zones created by the aerodynamics of the ducted diffuser wind turbine to pull or suck air through the rotor systems. The creation of the low-pressure area at the rear of the wind turbine forces the air to accelerate through the rotors and, as such, creates more wind energy than that of an open rotor wind turbine. The inner and outer rotors are counter-rotating to reduce vibration and asymmetrical effect.

A series of hydraulic pumps is connected to a number of drive shafts, one for each set of rotors, either through electromagnetic couplings that enable the SES to switch the individual hydraulic pumps on or off according to the wind speed or without electromagnetic couplings. When the SES is used without the electromagnetic couplings, variable displacement hydraulic pumps are used to enable the shutting down or switching off of unwanted hydraulic pumps without retaining unwanted mechanical drag associated with standard non-variable displacement hydraulic pumps. When switched off, the electromagnetic couplings have exceptionally low friction or drag on the system to improve the drive efficiency and maximize energy output. The multiple generators switch on or off through the same electromagnetic coupling system to provide maximum efficiency. Because the rotor drive is decoupled from the generators, the SES is able to use hybrid power sources to drive the generators when the wind speed is low or when additional energy is required to provide a constant on demand energy supply.

The electrical energy can be transmitted to an end user or an electricity transmission grid, or it can be used to power a mining process through electrochemical ion transfer for the extraction of metals such as gold, platinum and copper from slurry without the use of contaminant chemicals such as cyanide. During the mining procedure, the slurry goes through electrochemical ion transfer desalination process that produces hydrogen gas and oxygen as byproducts, and through the removal of the metals and contaminants, potable water is produced. The hydrogen and oxygen produced during the electrochemical ion transfer process is captured and stored separately in pressurized containers and can be used in the generation of energy through hydrogen fuel cell or by injecting the hydrogen and oxygen with natural gas into a gas turbine as a backup power supply to the SES. This enables the SES to provide self-sustainable energy at all times.

Referring to FIG. 1, the wind energy 1 is harvested through the decoupled ducted diffuser multiple rotor wind turbine or wind turbines 2. The ducted diffuser multiple rotor (DDMR) wind turbine 2 contains two or more separate decoupled rotor systems, and each of these rotor systems collects the energy and transmits it through a series of hydraulic pumps.

The wind accelerates as it travels through the wind turbine, which allows the SES to exceed the energy levels depicted within Betz's Law (a theory developed in 1919 by German physicist Albert Betz about the maximum possible energy to be derived from the wind by an open rotor wind turbine). Betz's Law is used by those skilled in the art of designing wind energy systems to predict energy levels possible through an open rotor wind turbine. The DDMR aerodynamic encapsulated cowling and diffuser reduce rotor tip and tower bypass noise and recover the energy lost through the blade tips of an open rotor. Each of the counter-rotating rotor assemblies drives a large gear, which in turn drives multiple hydraulic pumps. The hydraulic pump gear mechanism contains an electromagnetic coupling, which couples or decouples the hydraulic pump from the main gear drive, thereby allowing the hydraulic pumps to be individually turned on or off depending on the available wind speed or hydraulic pressure. The SES can be operated without the electromagnetic couplings but loses some efficiency through increased mechanical drag or friction.

By decoupling unwanted variable displacement hydraulic pumps at low wind speeds, the operational drag of the energy transmission is reduced, and efficiency is improved, enabling the SES to produce energy in very low wind speeds. Each variable displacement hydraulic pump has a solenoid-operated bypass valve that diverts the fluid flow through the variable displacement hydraulic pump when not in use. The power control unit (PCU) monitors the wind speed 38, drive shaft speed and hydraulic pressure via electrical sensors and then processes this data to determine how many variable displacement hydraulic pumps need to be activated at any moment in time.

In low wind speeds, the PCU will activate a small number of the variable displacement hydraulic pumps, (for example, one to four) to reduce the energy required to drive the hydraulics and thus maximize the energy efficiency from the given wind speed. At higher wind speeds, the PCU will automatically increase the number of variable displacement hydraulic pumps to extract further energy from the wind. In a preferred embodiment, the SES hydraulic drive can contain from six to thirty variable displacement hydraulic pumps, depending on the output size of the individual hydraulic pumps and the rotor diameter of the wind turbine.

The SES outer rotor uses the same hydraulic energy recovery system as the inner rotor (or rotors), although the drive mechanism is different. The drive on the outer rotor is supplied by a ring gear, which turns a drive shaft at the bottom of the outer rotor. The drive shaft turns a number of variable displacement hydraulic pumps, as shown in FIG. 12. The pressurized fluid from the variable displacement hydraulic pumps or pneumatic compressors passes down from the wind turbine 2 to the base of the dynamic tower 3 via a high-pressure hose 4 at an operating pressure of up to 5000 psi. In a preferred embodiment, the high-pressure hydraulic hose is the Gates EFG6K manufactured by Gates Corporation of Denver, Colo. The dynamic tower (shown as reference number 3 in FIGS. 13 and 14) of the present invention allows variable tower height settings during operation and maintenance. The high-pressure hose is retracted or extracted from the reel depending on the direction of the height adjustment of the dynamic tower through a computer-controlled hose reel at the base of the dynamic tower.

The high-pressure hose reel 6 at the base of the tower collects the hose when the SES is operating at a reduced height or during maintenance. The motor-driven hose reel 6 and dynamic tower 3 operate in unison during the height adjustment of the dynamic tower and are controlled by the SES computer control unit (CCU) 37. The hose reel and dynamic tower have an additional manual winding system for fail-safe backup. The dynamic tower is raised and lowered by electric motors built into the frame structure that alter the height of the dynamic tower and lock the dynamic tower in place. In lieu of electric motors, other types of motors such as hydraulic and pneumatic may be used. The motors are controlled by the CCU 37, which monitors data sent via structural sensors that are built into the dynamic tower (not shown) and the wind speed data from the wind turbine 2. The structural sensors are standard industry load sensors such as the SM63 made by Sensor Techniques Ltd. of Cowbridge, South Glamorgan, Wales, United Kingdom. If the wind speed reaches excessively high velocities, the tower will automatically lower to a safe operating height without the need to switch off the rotor drives, thereby enabling the SES to continue producing energy.

The pressurized fluid generated by the wind turbine rotor and hydraulic drive systems exits the hose reel and travels along a fixed hydraulic pipe 5 through a four-way electro-hydraulic servo valve 9 to the ground-located hydraulic accumulators 10. The valve 9 controls the flow of the pressurized liquid back and forth from the accumulators 10. As the velocity of the prevailing wind continually changes, so does the rotational speed of the rotor blades. With the present invention, the problem of dealing with continually changing energy input is eliminated due to the use of inline hydraulic accumulators 10 that absorb the fluctuating energy levels, store the excess energy, and supply a constant and controlled output to drive the generators.

The accumulator stores the hydraulic energy under pressure against a gas housed in the accumulator in a separate partition, and the increase in hydraulic pressure compresses the gas behind a diaphragm, piston or steel bellows which retains the energy as pressure for later release. The pressure exerted on the gas is then used to force the liquid back out of the accumulator and to either the remote ground-based electrical PMG's 15 or back to the wind turbine 2 to recover energy from the rotor braking system in extreme wind conditions. The hydraulic accumulator releases energy at a precise and constant pressure through the hydraulic line 5 and inline hydraulic filter 11 to the hydraulic motor 181 (FIG. 21) that drives the PMGs 15.

In general, before electricity can be passed into an electricity transmission grid, it has to be balanced so as not to affect the energy transmission. In prior art systems, the balancing of the electricity is usually done by expensive electrical systems that remove the spikes in power. In the present invention, the accumulators 10 store the spikes of energy and filter out the disruption that can be caused by the fluctuation of the energy production from the wind. This system enables energy to be retained and stored rather than lost by being earthed into the ground, which is what happens with prior art systems.

Each generator cluster houses multiple permanent magnetic generators (usually six per cluster), as shown in FIG. 1, and these clusters are modular so that any number may be added to the SES system. A single hydraulic motor rotates a generator drive gear, which in turn drives a series of smaller gears attached to each generator to produce the electrical energy output. Each generator has an electromagnetic coupling that switches on or off depending on the hydraulic pressure received by the hydraulic motor. This enables a reduced number of generators to operate in low wind speeds and higher numbers of generators in high wind speeds. The PMGs 15 can be driven by numerous wind turbines enabling a wind farm to have a single centrally located PMG assembly that houses numerous permanent magnetic generators powered by multiple wind turbines.

The direct current (DC) electrical energy is transmitted from the PMGs to an electrical junction control switch 18. From here, the DC electrical energy output can be split to power more than one end user. In the example shown in FIG. 1, the electricity is used to power a water desalination system 20 for the electrochemical mining of metals from water-based slurry and to power a hydrogen electrolyzer 21 for the production of hydrogen from the desalinated water. Alternately, the electrical energy can be used for numerous applications, including, but not limited to, being fed directly into a power transmission grid 34.

The water-based slurry 19 is made from mined ore that is broken down through series of crushers to particle sizes of approximately twenty (20) microns or less; the broken down ore is then added to water to create slurry. The slurry is pumped through a series of ion transfer modules, such as those manufactured by FET Group of Bristol, United Kingdom. The modules perform specific actions depending on the metals being mined and extracted through electrochemical ion transfer a specific material from the slurry in a single pass; the metals are then dried 23 and put into separate compounds 24. Some of the processes involved in the water desalination and metal, especially the process to remove alkaline metals, create hydrogen and oxygen gases as a byproduct, and these two gases are stored under pressure in containers 26 and 35.

The desalinated water then optionally passes through a hydrogen electrolyzer 21 to produce additional hydrogen. This process takes the energy required for the electrolysis process from the electrical junction switch 18. The electrolyzer converts the water into hydrogen and oxygen, which are then pumped to the pressurized storage cylinders for hydrogen 26 and for oxygen 35. The hydrogen from the pressurized storage cylinders 26 is pumped through a non-return valve 27 to a three-way valve 28 and directed to either a hydrogen fuel cell 29, a tanker for shipping 30a, or injected into a gas turbine 36 as a hybrid power source. The oxygen stored in the pressurized storage cylinders 35 can either be pumped via 44 to a gas turbine 36 as a hybrid reserve power to the SES to improve burning efficiency of the natural gas or shipped out for commercial use 30c. The desalinated water 22 can be further processed for drinking water, put back into the water system (river), or recycled and pumped back for the slurry process. The water could also be commercially shipped 30b.

The hydrogen fuel cell 29 supplies energy when required through a three-way electrical switch 32 to the electrical junction switch 18 for use in the SES mining process should the wind energy be low or, if there is an increase of demand for electrical energy, elsewhere in the system. The energy from the fuel cell can also be fed directly into a power transmission grid 34 on demand. The energy can be converted from DC to AC before entering a transmission grid through a DC to AC converter 33. The invention requires a single electrical DC to AC inverter 33 per system and not per wind turbine as with prior art systems. The three-way electrical switch 32 is controlled to distribute the electrical energy to an external transmission or end user either directly from the PMGs 15 or from the hydrogen fuel cell 29 or both.

The wind turbine decoupled rotor and drive of the invention enables additional hybrid energy systems 36 to be plugged into the hydraulic circuit through the hybrid variable displacement hydraulic pump 12 to drive the PMGs 15 when required. The hybrid power can come from any form of power supply, including solar, photovoltaic, geothermal, gas, steam, coal, hydrogen, fuel cell, diesel, oil and biomass. The hybrid power source drives the hybrid variable displacement hydraulic pump 12 to supply fluid to the hydraulic accumulators 10 to produce energy when the wind speed is low or an increase in energy is required.

A series of heat exchangers throughout the SES recover energy from the heat produced from anywhere in the system, including the electrical generators 16, the hydrogen electrolyzer 41, and the hydrogen fuel cell 31. The heat exchangers convert the heat into steam that is pumped by 42 and 14 through pipe 45 into a steam generator 17 that powers the hybrid hydraulic pump 12. The PMGs 15 have water jackets that remove excess heat created during operation and transfer the heat energy to the steam generator.

The SES has electrical sensors to monitor wind speed, wind direction, hydraulic operating and pump pressures, dynamic tower height and load stresses (vertical and horizontal), generator electrical output, accumulator energy reserves, mechanical operating temperatures, rotor speed, rotor shaft load and climatic conditions. The sensors are linked directly to the CCU 37, where the data is processed and stored before being fed back into the SES active units to adjust such elements as wind turbine direction and angle, dynamic tower height, and the number of hydraulic pumps or generators to activate. The CCU calculates the information and reacts accordingly to preset criteria. Specific information is sent and received by the SES via data communications 39 to allow reprogramming of software or to alert of an impending mechanical issue.

Figure 2:
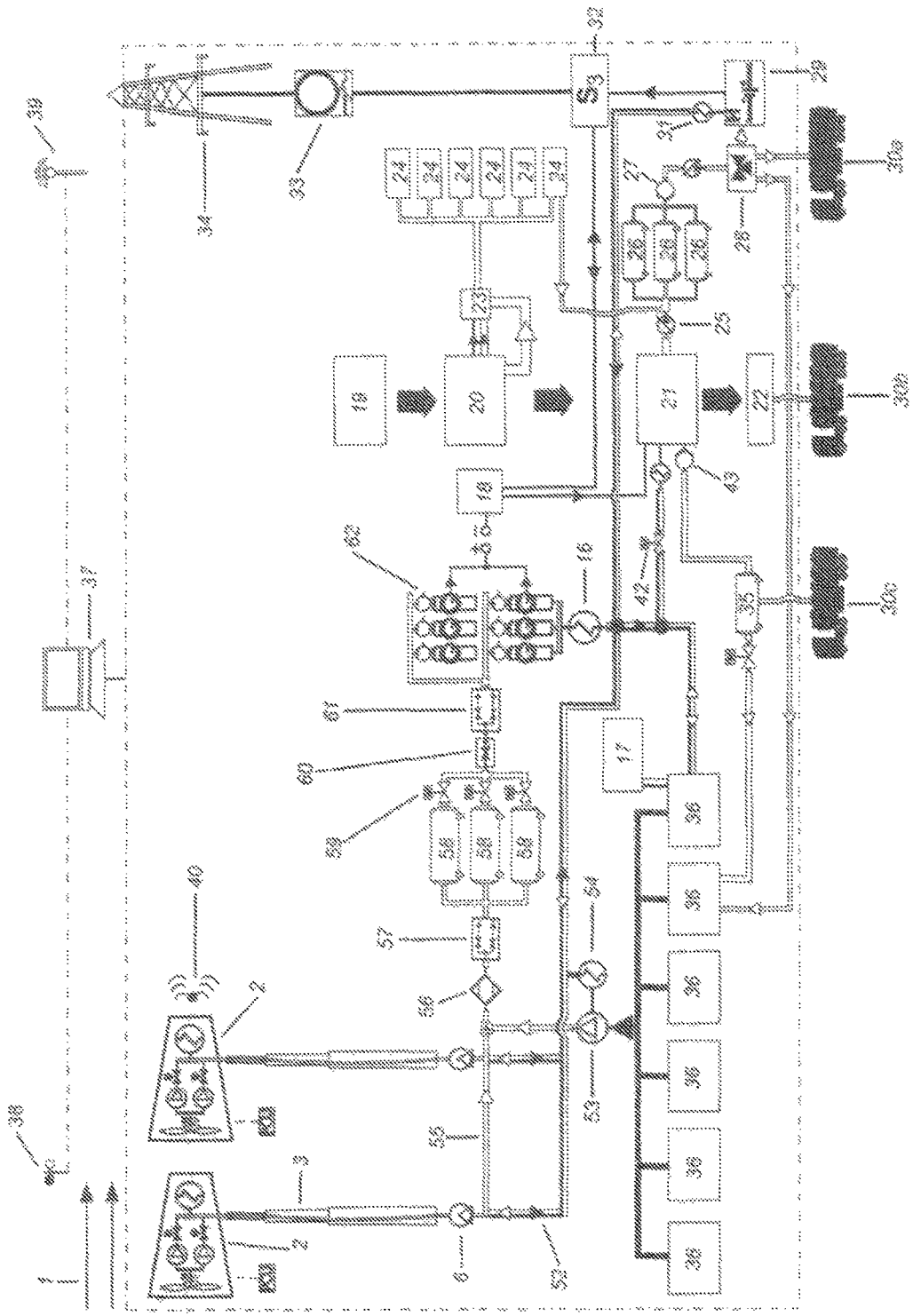
FIG. 2 is a schematic diagram of an alternate embodiment of the present invention in which pneumatic power is used in lieu of hydraulic power.

FIG. 2 is a schematic diagram of an alternate embodiment of the present invention in which pneumatic power is used in lieu of hydraulic power. The pneumatic system shown in FIG. 2 operates in much the same way as the hydraulic energy transmission, although it uses compressed air storage 58 to balance and store the excess energy. The wind energy 1 is harvested through the wind turbine 2. In FIG. 2, the wind energy is converted into pneumatic energy rather than hydraulic via multiple air compressors housed in the wind turbine in lieu of the hydraulic pumps of the first embodiment. The air compressors are connected to the two rotor drives through the same electromagnetic couplings used in the hydraulic version of the wind turbine 2.

The compressed air passes from the wind turbine and through pressurized pipe 55 and through an air dryer 56 to remove moisture from the system. Once it has traveled through the dryer 56, the compressed air passes through a dividing valve 57 to split the air into numerous high-pressure air storage vessels 58. The high-pressure air storage vessels 58 balance the energy produced and store the excess energy produced in the form of air pressure ready for controlled pressure release through air release valves 59. The pressurized air passes through a one-way valve 60 and through a second dividing valve 61 to drive high-speed pneumatic motors 62. The high-speed pneumatic motors 62 power the generators to produce the electricity. The excess heat is recovered from the pressurized air through heat exchangers in the SES and through the hybrid-driven compressor 53 through heat exchanger 54. This excess heat is converted into steam and piped through a two-way pipe 52 to power a steam generator 17. The energy created by the steam generator 17 is used to drive the hybrid variable displacement hydraulic pump to provide additional energy for the SES.

Figure 3:
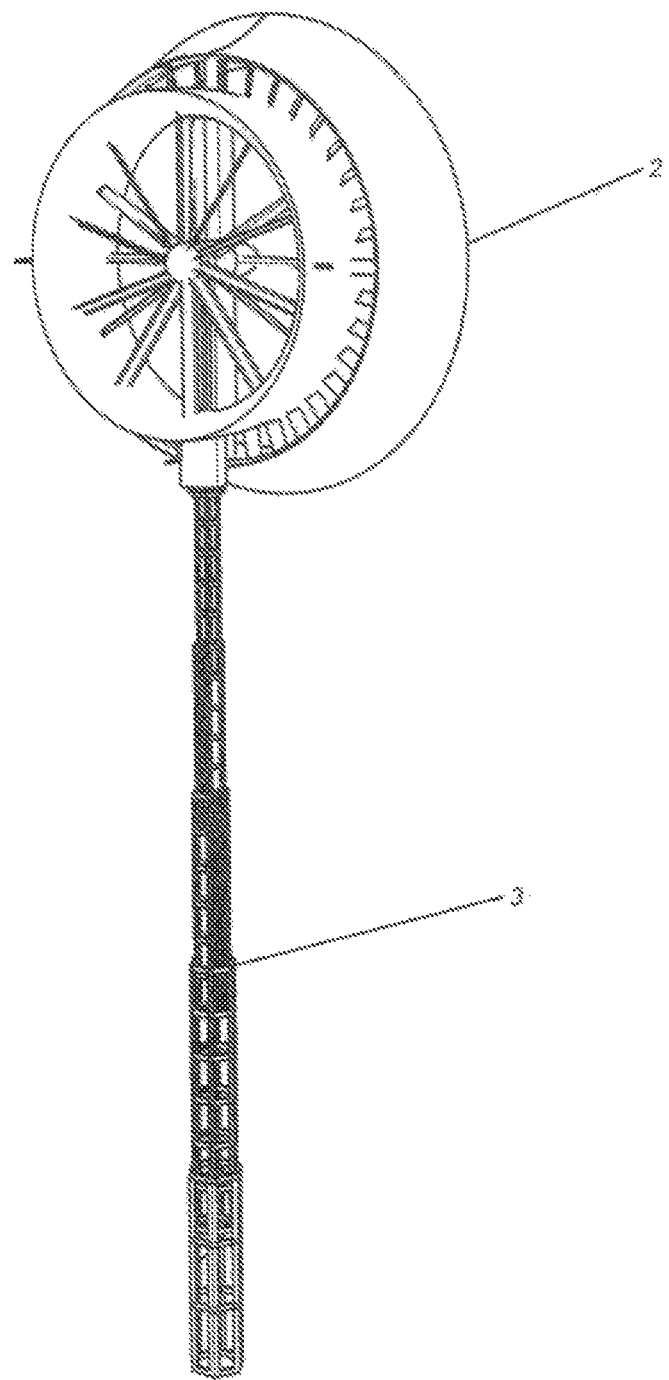
FIG. 3 is a front perspective view of the ducted diffuser multiple rotor wind turbine and dynamic tower of the present invention.

FIG. 3 is a front perspective view of the ducted diffuser multiple rotor wind turbine and dynamic tower of the present invention. This figure shows the ducted diffuser multiple rotor wind turbine 2 and dynamic tower 3 at the highest point setting of the dynamic tower 3 with the wind turbine forward facing into the prevailing wind. The separate stages of the telescopic dynamic tower 3 are also shown. Because the rotor blades of the wind turbine 2 are enclosed and not an open rotor or propeller, they produce a small radar footprint, which makes the present invention particularly suited for installations close to radar installations. The removal of the gearbox from the energy system and the fact that the generators are located at ground level means that the present invention is less likely to attract lightning strikes than conventional wind turbines.

Figure 4A:
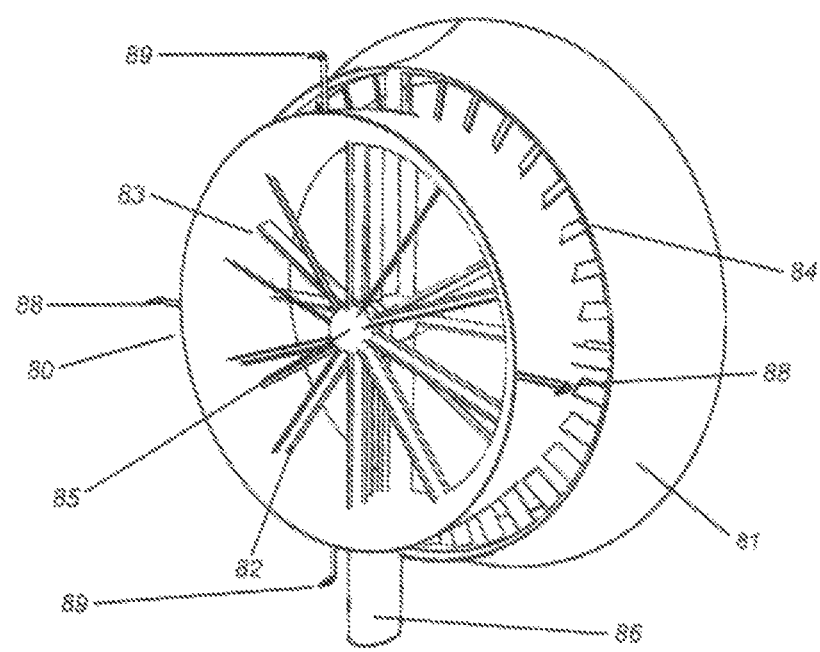
FIG. 4a is a front perspective view of the ducted diffuser multiple rotor wind turbine nacelle and diffuser of the present invention.

FIG. 4a is a front perspective view of the ducted diffuser multiple rotor wind turbine of the present invention. The cowling 80 creates a Venturi jet effect through the steep incline interior surface shape of the cowling 80, which works against the outer shape of the cowling. The narrowing of the internal surface accelerates and compresses the air passing through the wind turbine to provide an increase in energy when compared to an open rotor wind turbine of comparable size. The cowling 80 stabilizes the wind speed and consistency over an open rotor wind turbine. Below is the Venturi flow rate formula:

$$Q = A_1 \sqrt{\frac{2(p_1 - p_2)}{\rho\left(\left(\frac{A_1}{A_2}\right)^2 - 1\right)}} = A_2 \sqrt{\frac{2(p_1 - p_2)}{\rho\left(1 - \left(\frac{A_2}{A_1}\right)^2\right)}}.$$

The airflow enters through the front of the wind turbine 2 and through the air guides 82. The air guides direct and straighten the airflow through the front section of the wind turbine and into inner rotor blade 83, which rotate inside the cowling 80 at the point of highest air pressure and velocity. The inner rotor hub 85 of the wind turbine houses the wind turbine drive mechanism, and the aerodynamically shaped tower support 86 connects the turbine to the dynamic tower 3 (not shown). The air flow, which travels around the outside of the cowling 80 and under the diffuser 81, is drawn onto counter-rotating outer rotor blades 84.

The counter-rotating outer rotor blades 84 achieve three objectives: first, they remove wind energy from the airflow around the outside of the cowling 80; second, they create an area of low pressure behind the wind turbine; and third, they reduce vibration and asymmetrical torque effect and improve wind direction stability by rotating in opposite direction to the inner rotor blades 83. The diffuser 81 deflects the airflow away from the rear of the wind turbine to create an area of low pressure behind the wind turbine. The area of low pressure at the rear of the wind turbine draws the air through the wind turbine cowling 80 from the high pressure area at the front of the wind turbine. The air accelerating from the high pressure at the front of the wind turbine and through the inside of the cowling 80 compresses the air. It is the combination of the air compression and increased air speed that enables the wind turbine to exceed Betz's Law. Because of the combination of the wind turbine 2 aerodynamic cowling 80, the diffuser 81 and the outer rotor 84, the air speed that reaches the inner rotor blades 83 can be over three times the wind speed.

The wind turbine 2 has four wind speed sensors 88 and 89 located on the outside of the front of the cowling 80. The wind speed sensors work in two pairs on adjacent sides of the cowling—the two on the horizontal level 88 are one pair, and the two on the vertical plane 89 are the other pair. The wind speed sensors are monitored by the CCU 37 (see FIG. 1), which compares the wind speed registered by each one of the sensors in each pair. The CCU compares the two sensors 88 on the horizontal plane, and if one sensor is showing a higher wind speed than the other, the wind turbine is turned via the three-dimensional yaw control 143 (see FIG. 15) towards the wind speed sensor recording the lower wind speed (i.e., left to right or right to left). The software algorithm that processes the wind speed data removes wind gusts from the data, and the mean wind direction is calculated to hold the wind turbine in position and to stop continual direction hunting from left to right.

The vertical pair of wind speed sensors 89 (top and bottom locations) are controlled in exactly the same process as described for the wind speed sensors 88 except that the field of movement is up and down rather than left to right. The wind sometimes moves at angles rather just parallel to the ground, especially around objects such as buildings or on hills. Through the use of horizontal and vertical sensors, the invention controls the direction and angle of the wind turbine in a three-dimensional plane and is better able to accommodate wind moving at an angle to the ground than prior art systems that move the turbine in only two dimensions (left and right). Open rotor wind turbines used in wind farms rely on a low number of weather stations in front of the wind farm to determine wind direction and turn all of the wind turbines towards the data received by the weather station, which can be over a mile away. In the present invention, each wind turbine is optimized individually to its own space in a three-dimensional environment without the need for weather stations, radar or sonar devices.

Figure 4B:
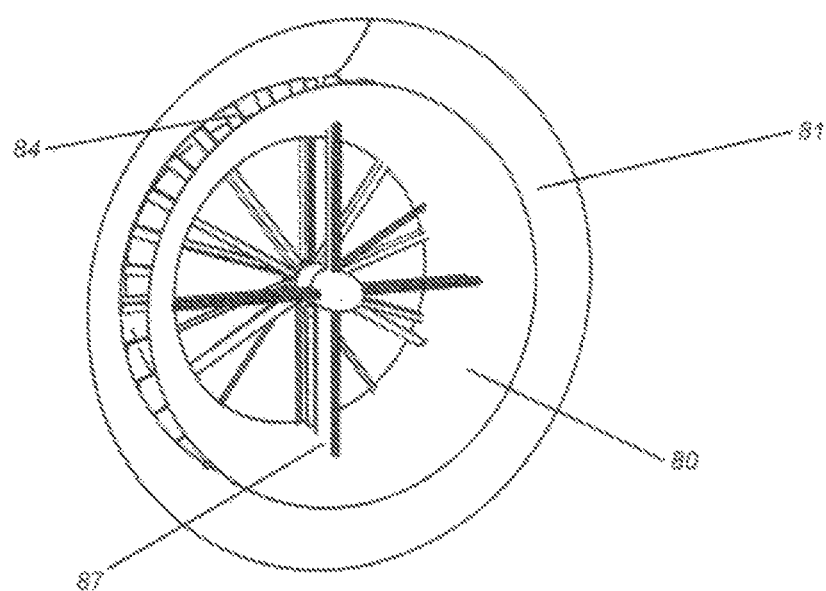
FIG. 4b is a rear perspective view of the ducted diffuser multiple rotor wind turbine nacelle and diffuser of the present invention.

FIG. 4b is a rear perspective view of the ducted diffuser multiple rotor wind turbine cowling 80 and diffuser 81 of the present invention. As shown in this figure, the exhaust of the cowling 80 and diffuser 81, where the air exits the wind turbine, is of a larger diameter than the that of the inlet at the front of both the cowling 80 and diffuser 81 (see FIG. 4), where the air enters the wind turbine. This difference in size between the exhaust and the inlet generates a low-pressure area at the rear of the wind turbine. The four structural staves 87 at the rear of the wind turbine support the diffuser 81 and the cowling 80.

Figure 5A:
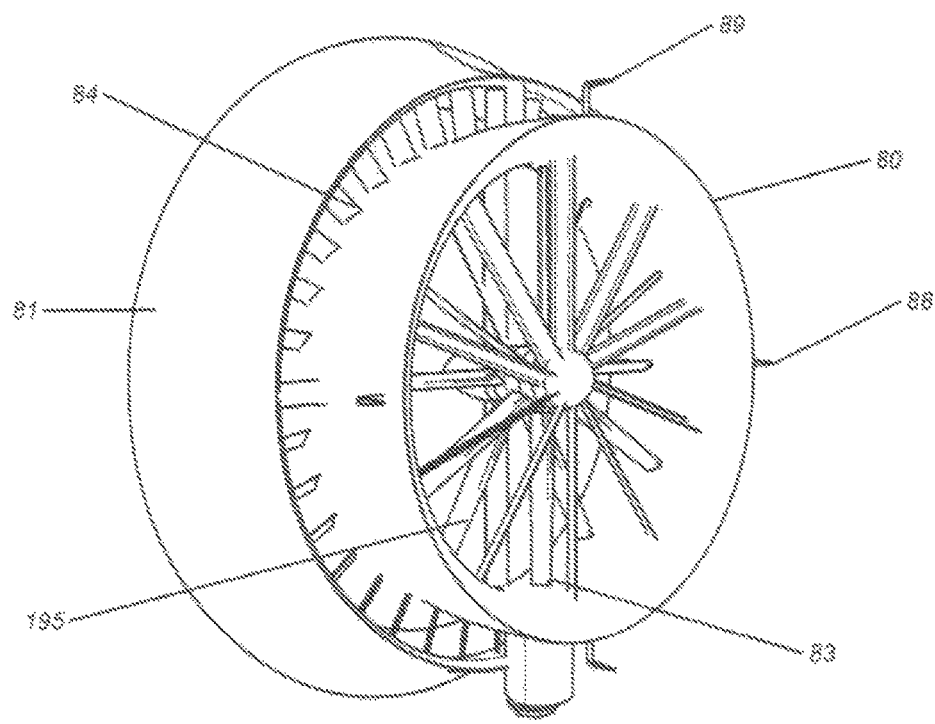
FIG. 5a is a front perspective view of the ducted diffuser multiple rotor wind turbine nacelle and diffuser of the present invention with two sets of internal rotors.
Figure 5B:
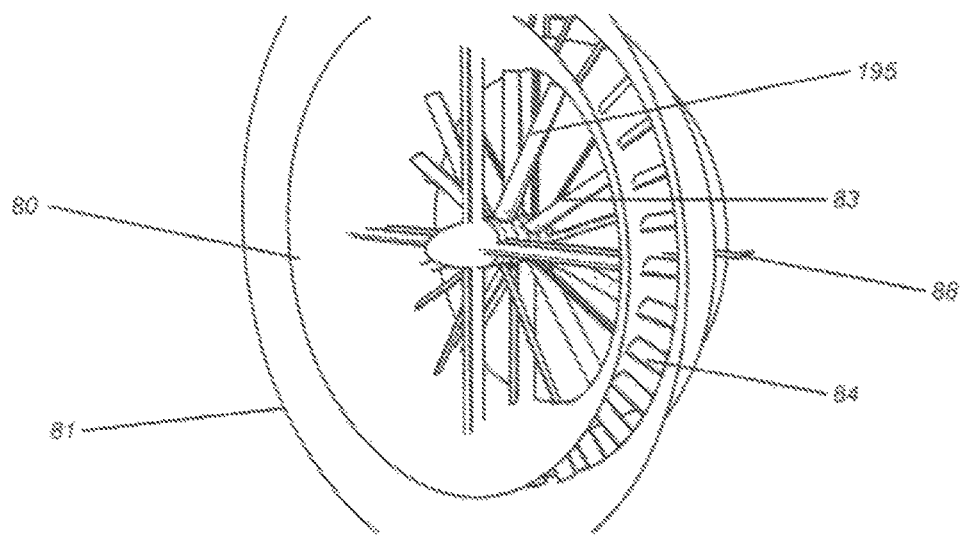
FIG. 5b is a rear perspective view of the ducted diffuser multiple rotor wind turbine nacelle and diffuser of the present invention with two sets of internal rotors.

FIG. 5a is a front perspective view, and FIG. 5b is a rear perspective view, of the present invention with two sets of internal rotors 83, 195. The rear inner rotor blades 195 are positioned directly behind the front inner rotor blades 83 and capture energy from the air that passes through the inner rotor blades 83. Approximately thirty percent (30%) of the wind energy that hits the front inner rotor blades 83 remains available after the wind has passed through the front inner rotor blades 83, and the remaining energy is used to rotate the rear inner rotor blades 195. The wind energy that rotates the rear inner rotor blades 195 is captured in the same manner as for the front inner rotor blades 83.

The rear inner rotor blades 195 are counter-rotating rotors, which mean that they rotate in the opposite direction as the front inner rotor blades 83. When there is low wind speed, the mass of the air flowing through the inner rotor blades usually causes a tangential or rotational air flow to be created by the spinning blades. The energy of this tangential air flow is wasted in a single-propeller design. The placement of a second propeller behind the first takes advantage of the disturbed airflow. The tangential air flow can cause the wind turbine to yaw left or right, depending on the direction of rotor rotation.

The rear inner rotor blades 195 counter the asymmetrical torque effect of the front inner rotor blades 83. Counter-rotating propellers can be up to sixteen percent (16%) more efficient than normal propellers. The rear inner rotor blades 195 shown in FIG. 5a have the same number of rotor blades as the front inner rotor blades 83, but the number of rotor blades in the front and rear sets of rotor blades may vary. For example, there could be five rotor blades on the front inner rotor blades 83 and six rotor blades on the rear inner rotor blades 195.

The installation of the rear inner rotor blades 195 is optional and would have considerable benefits in areas of very high wind speeds that average over thirty-five miles per hour. The use of the rear inner rotor blades 195 would enable smaller and stronger diameter wind turbines to be used to extract the energy from the higher wind speeds, and the system would still have benefits at low wind speeds.

In an alternate embodiment, the front inner rotor blades 83 are counter-rotating relative to the rear inner rotor blades 195. In one embodiment, the outer rotor blades 84 rotate in the same direction as the front inner rotor blades 83. In another embodiment, the outer rotor blades 84 rotate in the same direction as the rear inner rotor blades 195.

Figure 6:
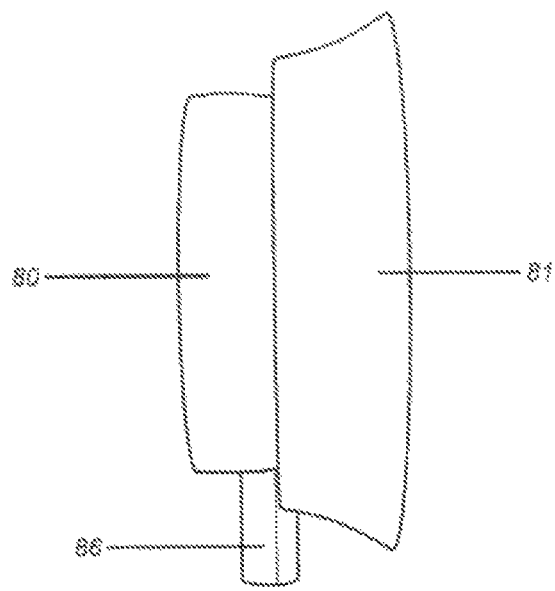
FIG. 6 is a side elevation view of the ducted diffuser multiple rotor wind turbine of the present invention.

FIG. 6 is a side elevation view of the ducted diffuser multiple rotor wind turbine of the present invention. As shown in this figure, the diffuser 81 is positioned around the cowling 80 with the front of the diffuser 81 extending approximately half the length of the cowling from the front of the cowling 80. The figure clearly illustrates the comparative size differential between the inlet and outlets of the wind turbine.

Figure 7:
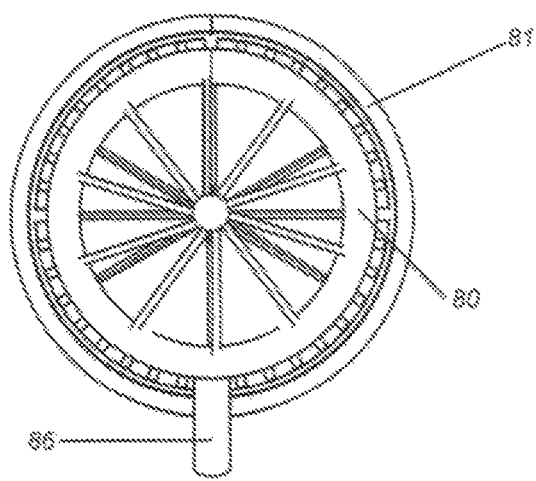
FIG. 7 is a front view of the ducted diffuser multiple rotor wind turbine of the present invention shown without the tower.

FIG. 7 is a front view of the ducted diffuser multiple rotor wind turbine of the present invention shown without the dynamic tower. This figure shows the cowling 80 and the diffuser 81 with the wind turbine tower support 86.

Figure 8:
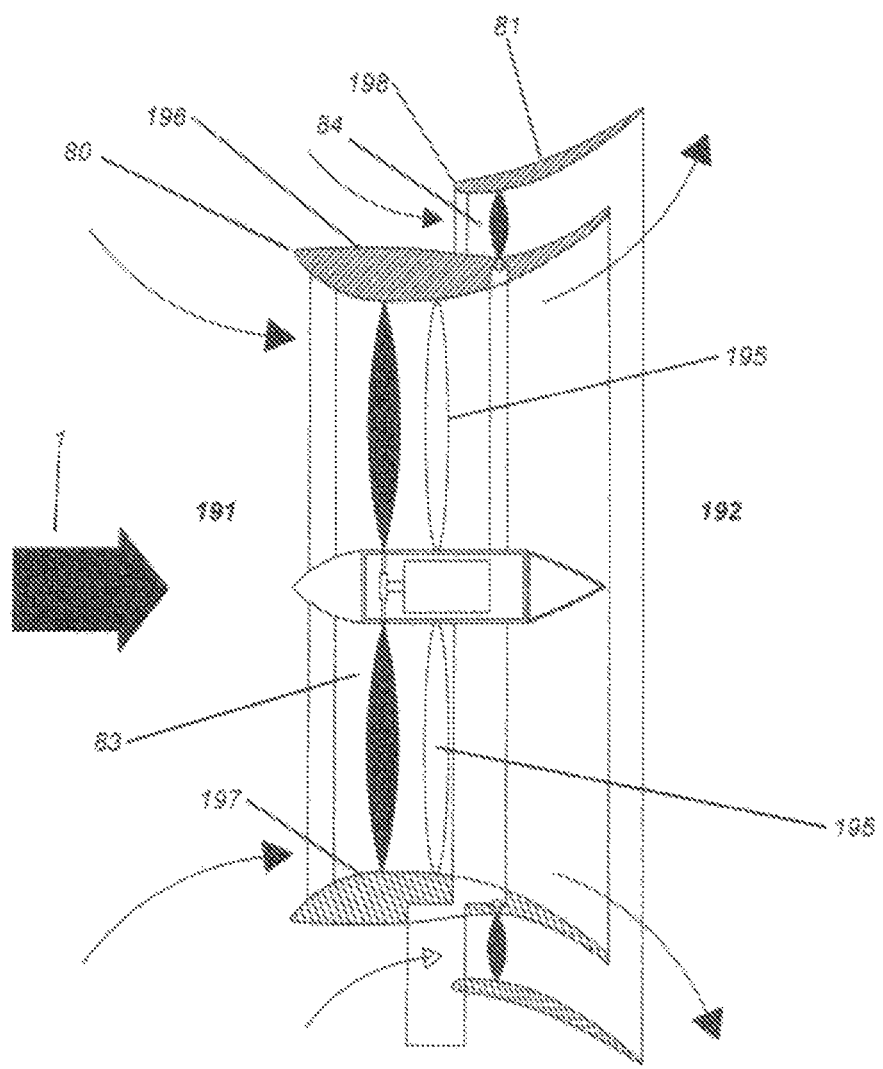
FIG. 8 is a side elevation cross-section view of the wind turbine of the present invention illustrating how air flows through the turbine.

FIG. 8 is a side elevation cross-section view of the wind turbine of the present invention illustrating how air flows through the wind turbine. This figure illustrates the airflow through the wind turbine and the acceleration of air through the cowling 80. The wind 1 enters through the front of the wind turbine 80. The inner surface 197 of the cowling 80 illustrates how the inside diameter of the cowling decreases quickly to form an inlet shape that curves in a smooth, deep incline before leveling out at the point where the inner rotor blades 83 are located. The inside diameter of the cowling 80 then gradually increases to the rear or exhaust of the cowling 192. The exhaust 192 of the cowling 80 has a larger diameter aperture than the inlet aperture 191; the larger the diameter of the exhaust, the quicker the air dissipates from the wind turbine, thereby creating a low-pressure area. The low-pressure area at the rear of the turbine works with the aerodynamics of the cowling 80 and the diffuser 81 to create the suction through the center of the wind turbine cowling.

The outer surface 196 of the cowling 80 has a reduced curve in the opposite direction to the inner surface 197 of the cowling 80; the outer curved surface 196 increases the air speed traveling through the inside of the cowling 80 and into the inner rotor blades 83. The acceleration in the air speed through the cowling 80 increases the energy available to be taken from the wind by the inner rotor blades 83. The air speed decreases once it has passed through the inner rotor blades 83 because a large proportion of the energy has been removed by the rotor blades and transferred into the drive system of the wind turbine. The reduction in wind energy at the rear of the wind turbine 192 creates an area of lower air pressure than at the front of the wind turbine 191, and this differential in air pressure sucks the air through from the front to the rear. An additional set of rear inner rotor blades 195 can be installed behind the inner rotor blades 83 toward the rear of the wind turbine to extract further energy from the wind. The rear inner rotor blades 195 are preferable in high wind velocity areas where a smaller rotor system is advisable due to the rotational stresses applied to a larger rotor blade in very high wind speeds.

The diffuser 81 guides the airflow at the rear of the wind turbine out and away, which has the effect of pulling the exiting air from the cowling outwards 80. Because the air speed is faster over the outer edge of the diffuser 81 than at the rear of the cowling 80, the slower air is pulled away from the back of the wind turbine to further reduce the air pressure at the rear. There is a gap between the leading edge 198 of the outer diffuser 81 and the outer surface 196 of the cowling 80 through which air passes. The counter-rotating outer rotor blades 84 use the energy from the air passing through this gap to rotate, and this energy is then harvested by the energy transmission system. The removal of the wind energy by the outer rotor 84 increases the effect of the diffuser 81 and helps to reduce the air pressure at the rear of the wind turbine 192, thereby increasing the pressure differential between the front and the rear of the wind turbine. The outer rotor blades 84 rotate in the opposite direction to that of the inner rotor blades 83 to reduce the asymmetrical torque effect and vibration.

The tips of each set of rotor blades 83, 84, 195 rotate within a distance of less than two inches from the inner surface 197 of the cowling 80 (in the case of the inner rotor blades 83) or the diffuser 81 (in the case of the outer rotor blades 84). A traditional open rotor system or propeller loses energy from the tips of the blades as the energy is deflected up and away, whereas the rotor blades in the present invention retain this energy. The ducted rotor system of the present invention reduces noise levels over an open rotor wind turbine due to the encapsulated environment created by the cowling 80 and the diffuser 81.

Figure 9:
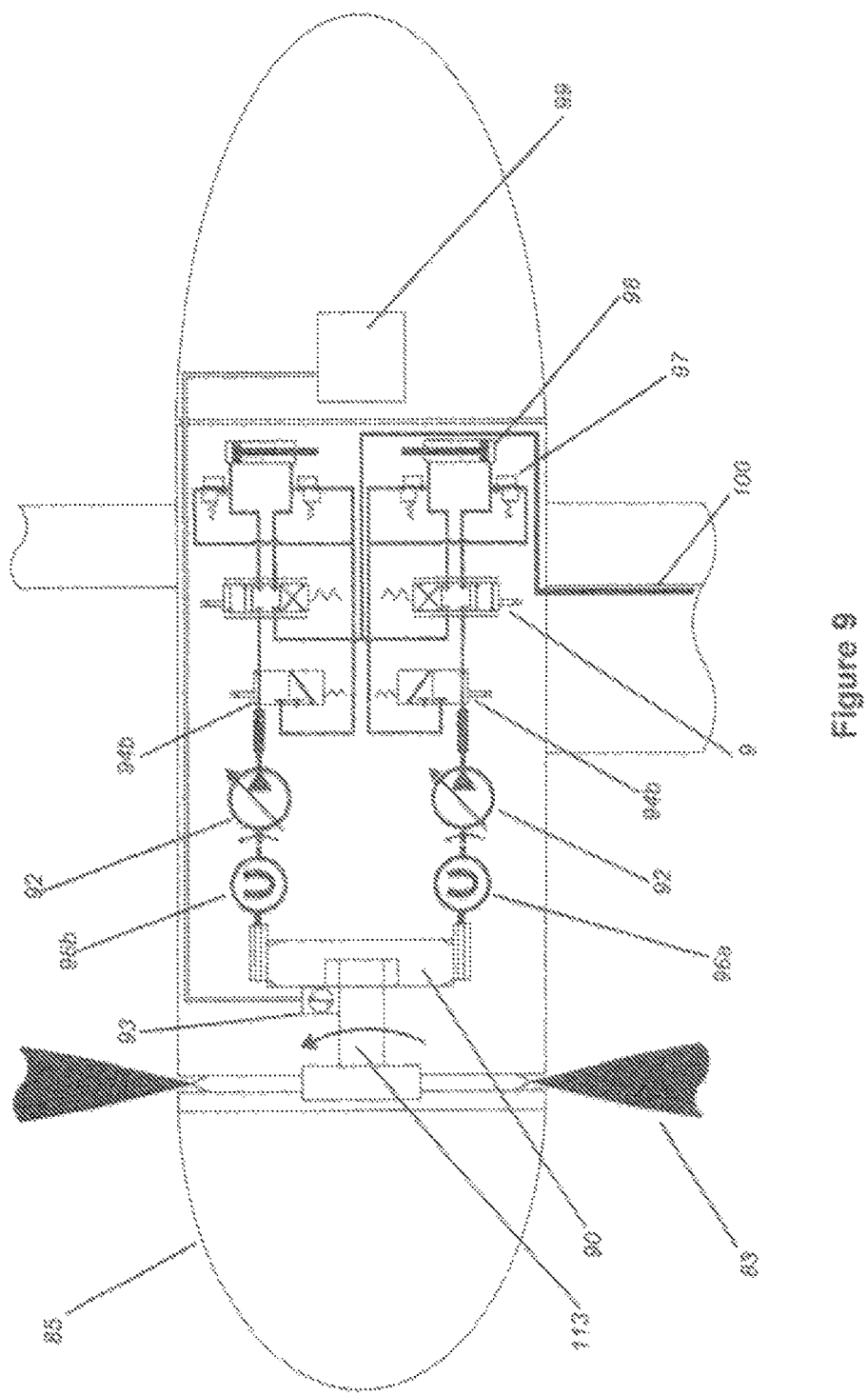
FIG. 9 is a schematic operating diagram of the wind turbine hydraulic drive system based in the nacelle of the present invention.

FIG. 9 is a schematic operating diagram of the wind turbine hydraulic drive system based in the wind turbine 2 of the present invention. This figure illustrates how the present invention converts the wind energy extracted by the inner rotor blades 83 and transmits that energy via a pressurized fluid for further conversion into electricity. The wind energy passing through the wind turbine causes the inner rotor blades 83 to rotate. The energy exerted in this rotation is removed from the wind and passed down the first drive shaft 113 connected to the rotor hub. The first drive shaft 113 rotates a first gear 90 inside the of the wind turbine. Connected to the first gear 90 are numerous first hydraulic pumps 92 that pump a pressurized liquid through a high-pressure hydraulic circuit. Each of the first hydraulic pumps 92 is connected to the first gear 90 through the first electromagnetic coupling 96a, 96b, which switches the pumps on or off depending on the information received by the first electromagnetic couplings 96a, 96b from the PCU 99, as described in connection with FIG. 1.

The PCU processes information received from either a driveshaft speed or a torque sensor 93 on the drive shaft 113 and/or from the hydraulic pressure and evaluates whether to switch the pump on or off. With the first electromagnetic coupling 96a switched on and the second electromagnetic coupling 96b switched off, the first gear 90 rotates without the drag of the variable displacement hydraulic pump 92 on the hydraulic system, which enables a greater percentage of the wind energy captured to be used for energy conversion. The PCU also controls the first and second electronic shutoff valves 94a, 94b, which open and close in line with the first and second electromagnetic couplings 96a, 96b, so that the variable displacement hydraulic pumps 92 become isolated to reduce pressure losses throughout the hydraulic system. The first and second electromagnetic couplings 96a, 96b are connected to the PCU, which controls not only the switching on and off of the electromagnetic couplings but also the speed and force at which the individual electromagnetic couplings are activated.

The benefit of this design is that each variable displacement hydraulic pump can be introduced into the system gradually as the electromagnetic coupling can be slipped in the same way that a torque converter would on an automatic gearbox. This design eliminates any sudden increase in hydraulic pressure into the system, thus protecting hydraulic seals and pipes from mechanical failure. The hydraulic fluid then passes through an electrohydraulic servo valve 9 and a hydraulic actuator 98 to control the fluid pressure and dampen the fluctuating pressure from the pump. The system is protected through pressure release valves 97 on either side of the actuator 98.

In high wind speeds, the PCU 99 will activate a high number of the hydraulic pumps to maximize the energy extracted from the wind. The variable displacement hydraulic pumps can work individually or in clusters; for instance, in large wind turbines of one megawatt (MW) output, the hydraulic pumps would work in six clusters with four pumps in each cluster and each cluster connected to a separate hydraulic line. The hydraulic lines 100 exit the wind turbine and extend down the dynamic tower through a centrally positioned coupling.

The first and second electromagnetic couplings 96a, 96b are separated from the hydraulic pumps 92 by a four-millimeter gap of air and do not have a mechanical connection. This eliminates the vibration that is usually created through a direct driveline and passed into the bearings and seals. The vibration in a typical open rotor wind turbine can lead to the breakdown of major driveline components such as the gearbox and generator through bearing and seal breakages and excessive heat generation. In the present invention, the decoupled hydraulic drive (the hydraulic drive is decoupled in the sense that the rotors can turn without driving the generators, and the generators work without having to turn the rotors) and electromagnetic couplings eliminate these problems while gaining operational efficiency and energy output.

Figure 10:
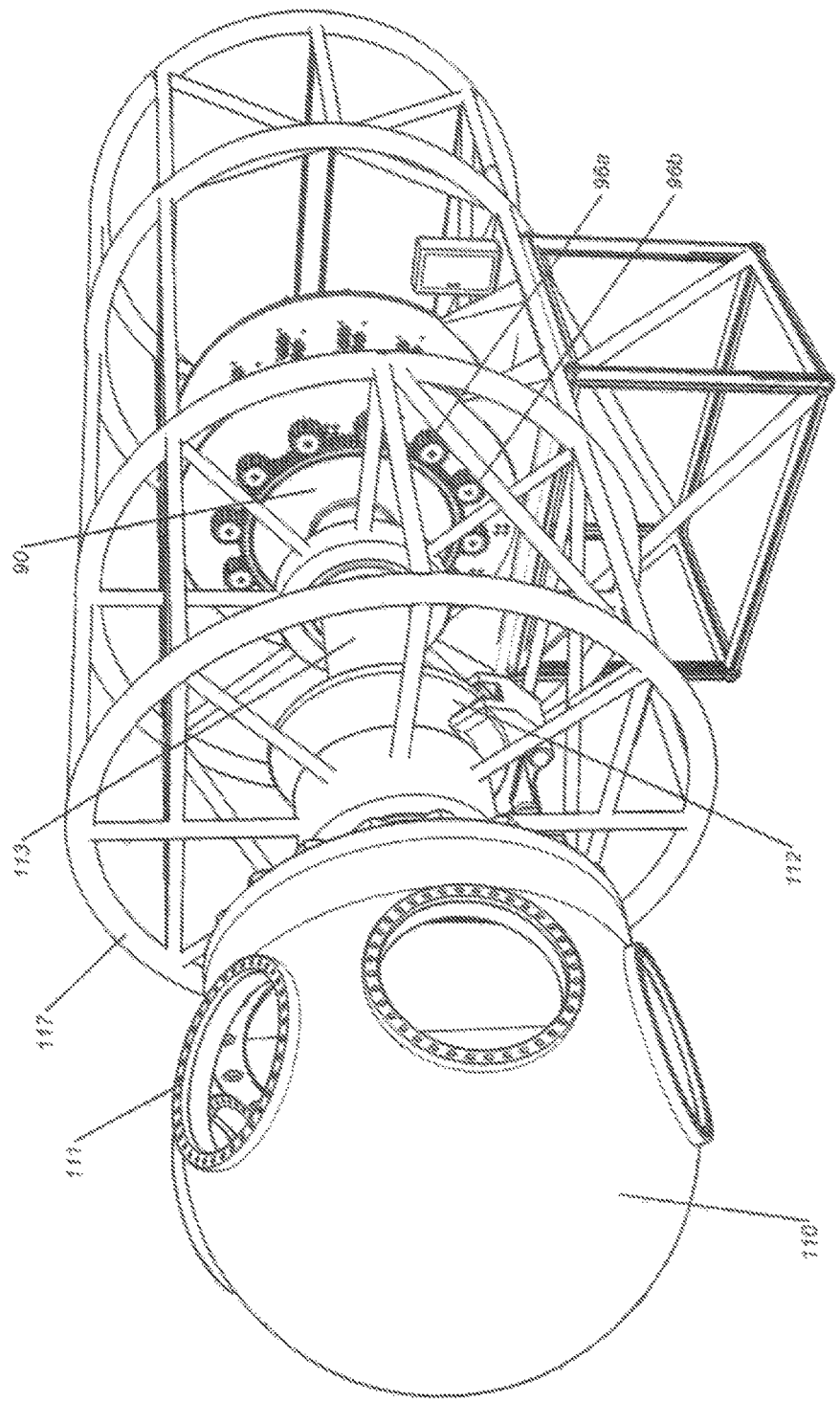
FIG. 10 is a front perspective view of the center nacelle frame and drive shown without outer cladding or body panels.

FIG. 10 is a front perspective view of the center of the wind turbine frame and drive shown without outer cladding or body panels. As shown in this figure, the wind turbine is constructed from a tubular space frame 117 that creates a strong and light support structure that is simple to repair or maintain. The inner rotor blades (see FIG. 4, reference number 83) bolt into the rotor hub 110 through the separate rotor blade attachment housing 111. The rotor hub 110 is preferably constructed from metal or carbon composites. The rotor hub 110 is attached to a steel or carbon composite first drive shaft 113 that rotates with the rotor blades when the wind blows, thereby driving the large gear 90. The rotating gear 90 drives a series of electromagnetic couplings 96a, 96b, which in turn drive the hydraulic pumps 92 (not shown) to transmit the energy from the rotor blades. The disc brake 112 is attached to the first drive shaft 113 and is used to slow the drive shaft rotation in extreme conditions or to lock the drive shaft still during maintenance. The PCU 99 controls the activation of the hydraulic pumps, the yaw control for the rotor blades (not shown), and the disc braking system.

Figure 11:
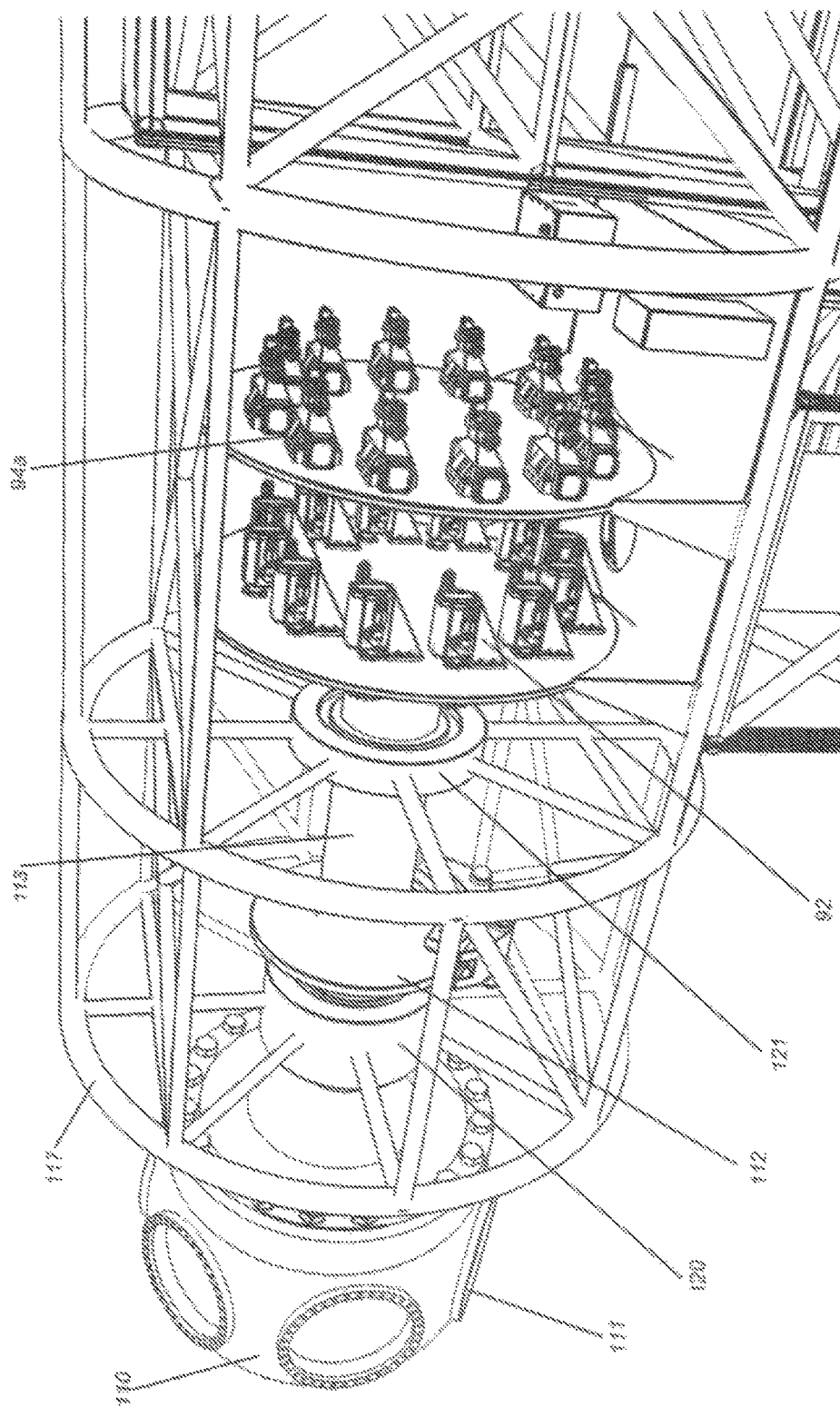
FIG. 11 is a rear perspective view of the center nacelle frame and drive shown without outer cladding or body panels.

FIG. 11 is a rear perspective view of the center of the wind turbine frame illustrating the drive system shown without outer cladding or body panels for clarity. This view shows the location of the hydraulic pumps 92 and the directional shut-off valves 94a, 94b. The first drive shaft 113 bolts onto the rotor hub 110 and is supported by the two large bearings 120 and 121.

FIG. 12 is a perspective view of a section of the outer rotor system of the present invention. The outer rotor 84 is constructed in sections for easy transportation and on site assembly. The outer rotor assembly 131 rotates around the cowling 80 on roller bearings 133 built into the assembly 131. The outer rotor blades 84 are attached to the outside of the assembly. Attached to the outer rotor assembly is a ring gear 132 that drives an outer rotor drive gear 199 and the second drive shaft 134. Attached to the end of the second drive shaft 134 is the second gear 135, which drives a series of second electromagnetic couplings 136 that are individually connected to the variable displacement hydraulic pumps 92.

The second electromagnetic coupling 136 and variable displacement hydraulic pumps 92 operate in the same way as the inner rotor drive described in FIG. 9. If the wind velocity is low, only one hydraulic pump will be activated, and in high wind velocities, all of the variable displacement hydraulic pumps 92 will be activated. The pressurized fluid enters and exits through the high pressure hydraulic pipes 45. Because the second electromagnetic couplings 136 do not drive the variable displacement hydraulic pumps 92 through a mechanical connection, little or no vibration is carried through the wind turbine. The reduction in vibration improves reliability and reduces maintenance.

Figure 13:
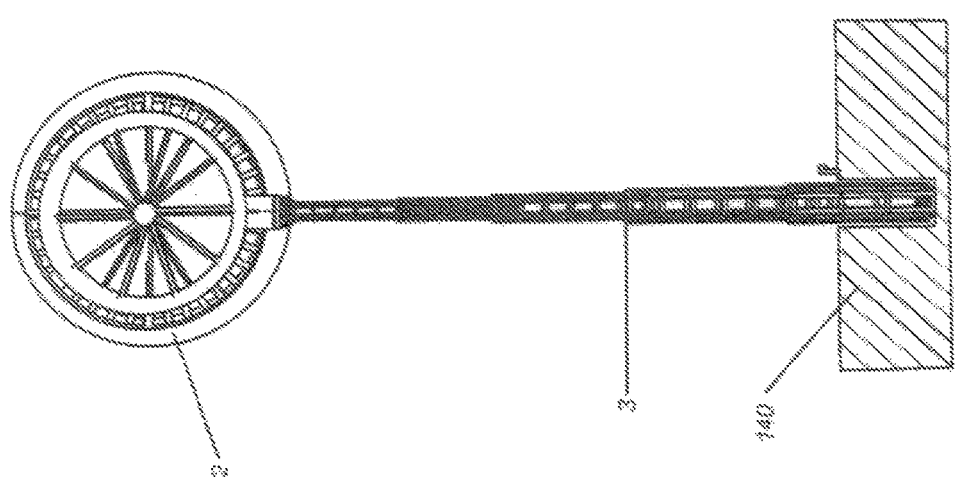
FIG. 13 is a front perspective view of the dynamic tower and wind turbine of the present invention shown in a raised position.

FIG. 13 is a front perspective view of the dynamic tower 3 and the wind turbine 2 of the present invention shown in a raised position. The dynamic tower 3 is an automated motorized active or dynamic telescopic tower that automatically adjusts the height of the wind turbine 2 depending upon operational conditions or requirements determined by the PCU 99, which monitors the conditions through sensors on the dynamic tower 3 and the wind turbine 2. The dynamic tower 3 uses built-in, high-power DC motors (shown in FIG. 18) to power the electromagnetic drives (160 in FIG. 18) to raise and lower the dynamic tower and also to lock the dynamic tower in position. Sensors for vertical and horizontal loads measure the stress being applied to the dynamic tower, and speed sensors monitor the rotational speed of first gear 90 and second gear 135 (not shown). These sensors send information to the CCU 37, which acts on the information (together with additional information from the wind turbine such as rotor speed) according to preprogrammed criteria.

If the load sensors in the dynamic tower 3 detect movement in the dynamic structure due to high wind speeds or excessive rotor speed from the wind turbine, then the dynamic tower 3 will automatically lower to a safe operating height for either load stress or wind speed so that the wind turbine can continue to operate rather than switch off and cease energy production, as open rotor wind turbines do. The dynamic tower enables the wind turbine 2 to be assembled at a low level and then raised once the assembly is complete without the need for large cranes. The dynamic tower can be lowered for routine maintenance, which is considerably safer and more economic than maintenance procedures currently employed with open rotor wind turbines.

FIG. 13 shows the dynamic tower 3 fully extended with the base of the dynamic tower 3 sunk in to the ground 140. In this illustration, the dynamic tower 3 is shown without a cover or cladding. Each section of the dynamic tower is preferably fabricated from steel, although it is also possible to use carbon composite materials, which are especially suited to mobile or temporary applications and installations close to radar systems because they reduce the radar interference. The dynamic tower 3 construction is hexagonal in shape, and all of the sections fit tightly together to add strength to the construction while maintaining ease of build.

Figure 14:
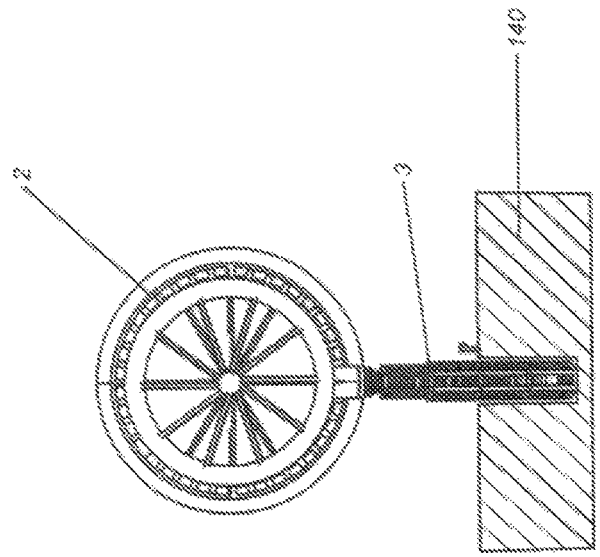
FIG. 14 is a front perspective view of the dynamic tower and wind turbine of the present invention shown in a lowered position.

FIG. 14 is a front perspective view of the dynamic tower 3 and wind turbine 2 of the present invention shown in a lowered position. This figure clearly shows the height differential between the extreme raised and lowered positions.

FIG. 15 is a detail perspective view of the below-ground installation of the dynamic tower in the lowered position shown with the wind turbine yaw control 143 and hydraulic pipe winding device 144. The dynamic tower raises and lowers through a dynamic tower electromagnetic drive (see FIG. 18, reference number 160) and drive rail 141 that are integrated into each individual section of the dynamic tower 142. The dynamic tower has an integrated three-dimensional yaw control 143, which aligns the wind turbine 2 into the mean direction of the wind. By integrating the yaw control into the tower, the manufacturing and assembly of the SES becomes considerably easier and safer than an open rotor wind turbine, which has the yaw control separate from the tower.

When the dynamic tower is lowered, the hydraulic hose used in the SES energy transmission is wound automatically onto a reel 144 located at the base of the dynamic tower structure 3. (In an alternate embodiment, the reel 144 is located above ground.) The reel 144 is motorized and works in conjunction with the dynamic tower electromagnetic motor drive (see FIG. 18, reference number 160) to synchronize the movement of the dynamic tower. A manually operational service panel 145 is located next to the base of the dynamic tower to enable the dynamic tower to be operated manually during maintenance and installation procedures. The manually operational service panel contains a manual override and electrical power point so that an external power source can be added to power the dynamic tower electromagnet drive system during maintenance or repair.

FIG. 16 is a front perspective view of the dynamic tower 3 installed on the surface of the ground through the use of steel cables 146 and a platform base support 147. This figure shows the dynamic tower 3 in the lowered position; the installation is above ground in this example for use as a temporary installation or on contaminated ground. The tower is held in place through the use of steel cables 146 and a wider platform base support 147, and the hydraulic hose reel 144 and manually operated service panel 145 are installed on the surface of the ground. The steel cables 146 support the dynamic tower and are pinned to the ground with steel stakes 148.

Figure 17C:
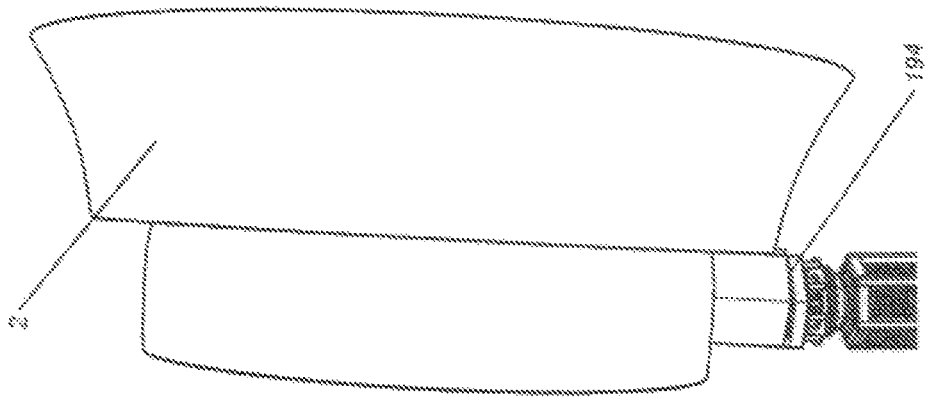
FIG. 17C is a perspective view of the wind turbine of the present invention tilted backward.
Figure 17B:
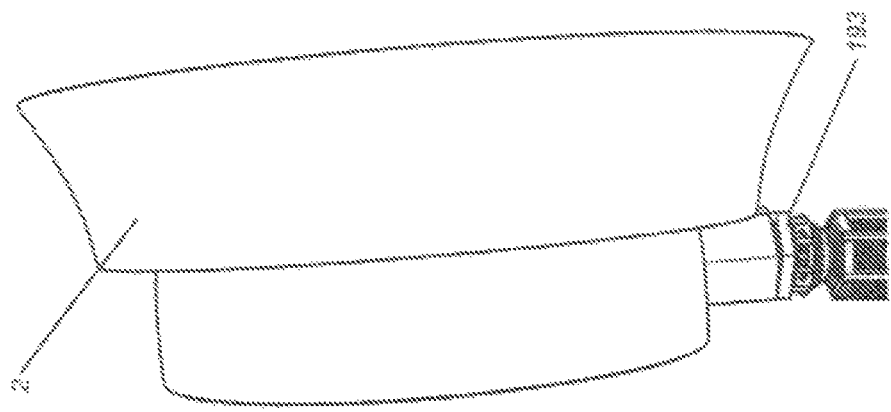
FIG. 17B is a perspective view of the wind turbine of the present invention tilted forward.

FIG. 17A is a perspective view of the three-dimensional yaw control system of the present invention with the facing panels removed to illustrate the two drive systems. The three-dimensional yaw control is integrated with the dynamic tower 3 to position the wind turbine into the mean direction of the wind on both horizontal and vertical planes. The main components of the three-dimensional yaw control are a yaw bearing 150, which rotates the wind turbine left or right, and a central horizontal platform 153 to tilt the wind turbine forward or backward, as shown in FIGS. 17B and 17C. For the horizontal movement (left and right), a series of electric yaw horizontal drive motors 151 are attached to a horizontal yaw ring gear 157 inside the three-dimensional yaw control system. When power is supplied to the electric yaw horizontal drive motors 151, they rotate the three-dimensional yaw control left or right via a horizontal yaw drive gear 156, which turns the system by driving on the horizontal yaw ring gear 157. When the electrical power is removed from the electric yaw horizontal drive motors 151, they become fixed in place and act as the braking mechanism to hold the wind turbine in place. This system enables precise positioning of the wind turbine to obtain the optimum wind speed and direction. The drive and positioning can be done with the use of hydraulics in place of the electrical system described.

The vertical positioning of the wind turbine is controlled by the vertical yaw drives 155, which are incorporated within the structure 154 and are connected to the drive rail 153 on the platform 152. The vertical yaw drives 155 tilt the yaw control platform up or down by driving the curved yaw tilt rail 153. As the vertical yaw drives 155 rotates on either side of the structure 154, the vertical yaw drives 155 lock into the drive rail 153 on the platform 152 to tilt the angle of the wind turbine (see FIG. 3, reference number 2). The vertical yaw drives 155 (see FIG. 18) lock in place and act as the holding brake when the electrical power is removed, thereby acting as a safety mechanism and saving on energy usage. The position of the wind turbines is determined by the CCU (see FIG. 1, reference number 37), which receives data from wind speed sensors 88 and 89 (see FIG. 4) that provide the mean wind direction and remove the intermittent gusts of wind. In this manner, the position of the wind turbine can be fine-tuned in a three-dimensional field to extract the optimum available wind energy.

In a wind farm where multiple wind turbines are positioned close together, the efficiency of the wind farm is enhanced because each wind turbine is individually optimized to the wind conditions local to the wind turbine rather than all of the wind turbines working from a central wind data point. The three-dimensional yaw control of the present invention has considerable benefits in urban areas and on skyscrapers where the wind becomes turbulent. The air exiting the wind turbine can be directed up or down, enabling the wind turbines to be grouped closer together.

The three-dimensional yaw control system of the present invention controls the wind flow through the wind turbine (see FIG. 3, reference number 2) to extract the maximum wind energy available, and it also controls the wind speed through the wind turbine in extreme wind speeds by either tilting or turning the wind turbine away from the prevailing wind to reduce the speed of the wind reaching the rotor blades. The ability to control the angle of the wind turbine against the prevailing wind, combined with the ability of the CCU (see FIG. 1, reference number 37) to control the height of the dynamic tower (see FIG. 3, reference number 3), enables the SES to operate in very high wind speeds angling the wind turbine into the wind without the need to brake and stop the rotors from turning to avoid damage to the wind turbine. Open rotor wind turbines would usually cease rotating in wind speeds of fifty-five (55) miles per hour, whereas the present invention will operate in wind speeds up to eighty (80) miles per hour.

FIG. 17B is a perspective view of the wind turbine 2 of the present invention tilted forward on the three-dimensional yaw control system at an angle of ten degrees (10°) 193. FIG. 17C is a perspective view of the wind turbine 2 of the present invention tilted backward 194 at an angle often degrees (10°). The wind turbine 2 can be tilted up to an angle of thirty-five degrees (35°) in either direction, up or down.

Figure 18:
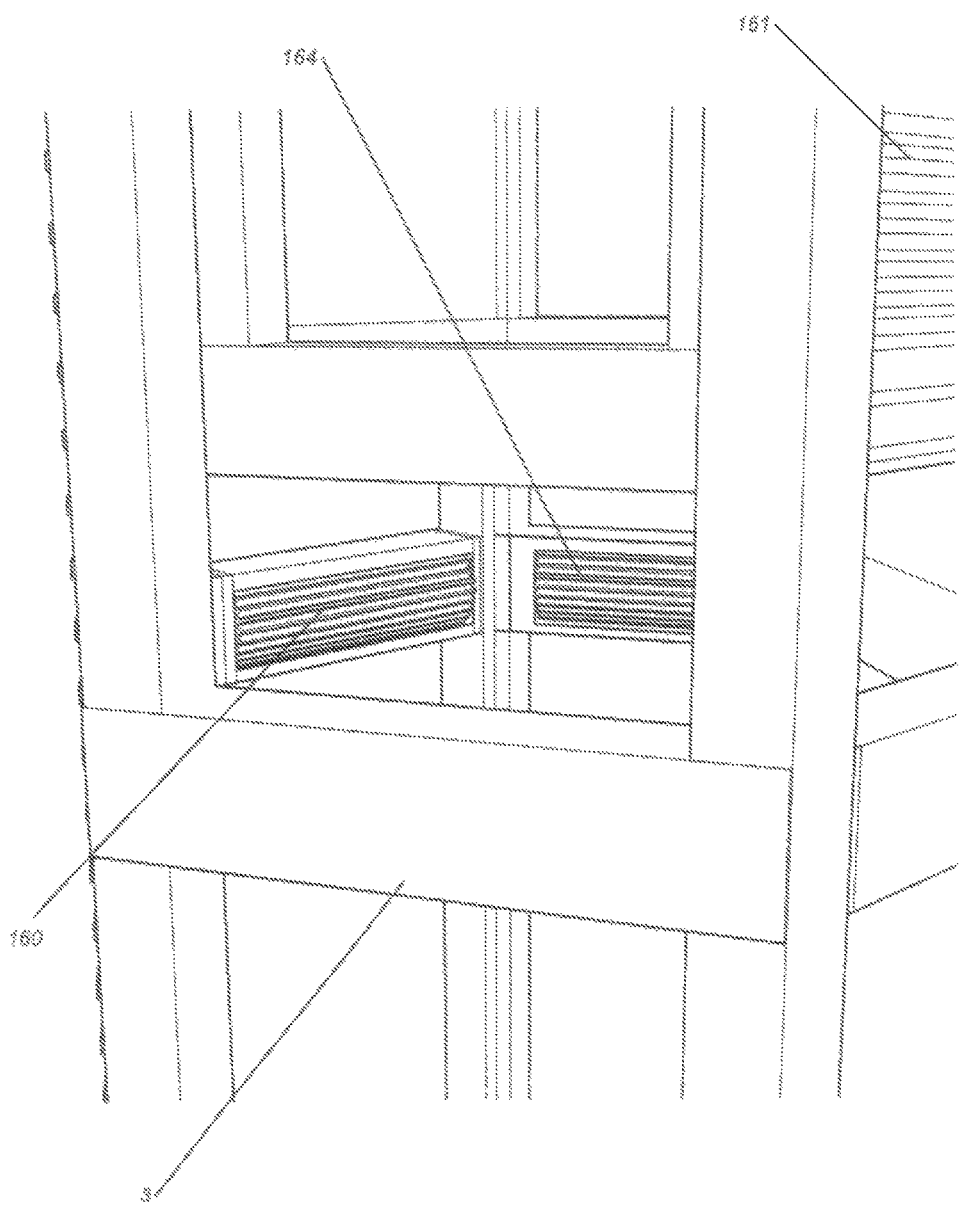
FIG. 18 is a perspective view of the dynamic tower drive system used to raise and lower the tower during operation.

FIG. 18 is a perspective view of the dynamic tower drive system used to raise and lower the dynamic tower during operation. The dynamic tower (see FIG. 3, reference number 3) is assembled in a number of sections 142 with each section 142 fitting inside the lower section of the dynamic tower. Incorporated within the hexagon frame of the dynamic tower are a series of electromagnetic drives 160 that control the movement of each section of the tower. The electromagnetic drives 160 work in pairs on opposite sides of the hexagonal frame structure, and each hexagonal section 142 has a dynamic tower electromagnetic drive 160 and a dynamic tower roller guide 164, which is the same as the dynamic tower electromagnetic drive but without a power drive. Each lifting section 142 of the dynamic tower has at least two pairs of electromagnetic drives 160, each pair being capable of lifting the designed lift capability of the dynamic tower section 142. There are two electrical circuits per dynamic tower, and each pair of electromagnetic drives 160 per tower section operates off either of the two electrical circuits so that failure to one electrical circuit still enables the dynamic tower to operate.

The dynamic tower electromagnetic drive gear 160 locks into the drive rail 141, and as the electromagnetic drive rotates, it moves the dynamic tower section 142 either up or down. The electromagnetic drive 160 is also the braking mechanism for the dynamic tower. Without an electrical supply the electromagnetic drive gear 160 locks in place and only becomes operational with electrical power, which means the dynamic tower automatically locks if all power is lost.

Figure 19:
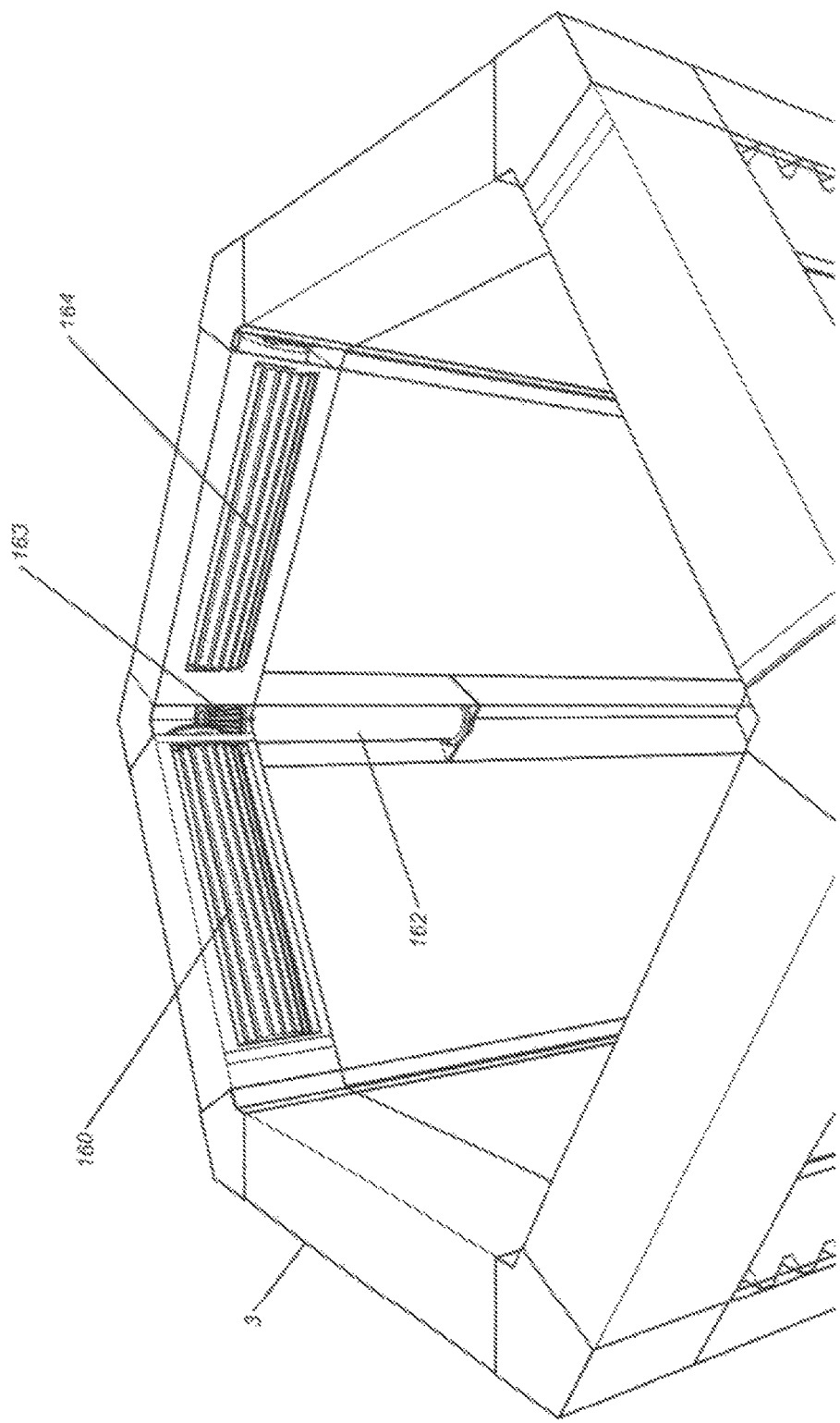
FIG. 19 is a detail interior view of the electromagnetic drive of the dynamic tower of the present invention.

FIG. 19 is a detail interior view of the dynamic tower electromagnetic drive 160 of the present invention. This figure shows the electromagnetic drive 160 with the high-power DC motor 162 installed in the dynamic tower 142. The DC motor 162 is fitted in the frame structure of the dynamic tower and is accessible through panels on either side of the tower frame. The DC motor 162 drives the electromagnetic drive gear 160 through a bevel gear 163 to take the output from a vertical axis to a horizontal axis. The electromagnetic drive 160 is recessed into the frame of the structure and only protrudes out of the frame to link into the drive rail 141 (see FIG. 18). This configuration enables each section of the dynamic tower 142 to fit securely inside the section immediately below, thereby eliminating any lateral movement from the dynamic tower sections 142.

Each set of electromagnetic drives is capable of operating the dynamic tower movement. When the electrical current is switched off, the electromagnetic gear drive automatically locks in position to hold the dynamic tower in place, which acts as a safety mechanism and saves energy when the height of the tower does not need to be adjusted.

In addition to the electromagnetic drive 160 and DC motor 162, each section of the tower has roller gears that keep the sections of the tower tight against the inserted telescopic section inside and provide strength in the tower mast similar to a rigid unit. The roller gears are the same as the electromagnetic gear drive 160 but without the DC motor 162 to power the gear in movement. As with the dynamic tower electromagnetic drive, the roller gears lock when the electrical power supply is removed to hold the mast in position. Both of the electrical circuits in the dynamic tower have a plugin backup system at the base of the tower through the manually operational service panel 145 (see FIG. 15) that can be used by trained maintenance personnel to release the electromagnetic lock for repair and general maintenance.

Figure 20:
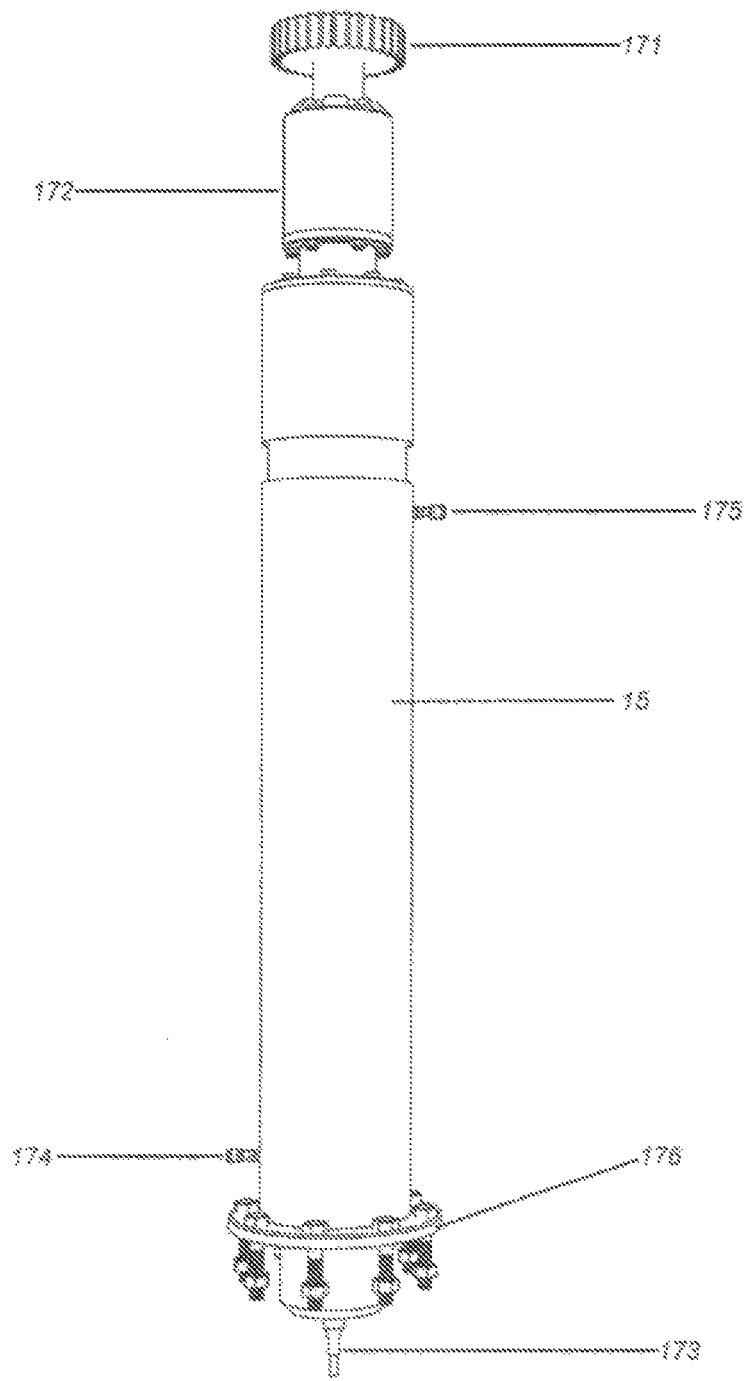
FIG. 20 is a perspective view of the permanent magnet generator of the present invention shown in vertical orientation with a water jacket and an electromagnetic variable drive.

FIG. 20 is a perspective view of the permanent magnet generator 15 of the present invention shown in vertical orientation with a water jacket and PMG electromagnetic coupling 172. As shown in this figure, a single PMG 15 is used to turn the wind energy into a high-voltage direct current electrical output. The PMG 15 operates in clusters of identical generators that switch on and off individually as and when the demand is required. In a preferred embodiment, the PMG 15 is a 200-kilowatt version that measures one meter twenty centimeters (four feet) in height and 15 centimeters (six inches) in diameter and weighs 200 kilograms (440 pounds). The total weight of the PMG 15 for a 2-MW wind turbine is two tons compared to thirty (30) tons for a standard induction generator used in an open rotor wind turbine. The PMG 15 can be manufactured in output capacity from ten kilowatts to multiple megawatts.

The PMG 15 is driven by a generator drive gear 171 at the top of the assembly that is turned by either a hydraulic or pneumatic motor at a set geared speed of 5000 rpm. The generator drive gear 171 turns the PMG electromagnetic coupling 172, which turns the generator enclosed in the PMG 15 outer casing and water jacket. The PMG electromagnetic coupling spins the drive in the PMG 15 without a direct mechanical linkage, which significantly reduces the vibration carried through a drive system and enables the generator to be detached from the gear drive 171 when required. The electricity generated by the PMG is transmitted through the electrical cable 173 at the bottom of the generator.

In operation, the PMG 15 generates heat from the mechanical movement, as is true of any similar generator. The PMG 15 has a water jacket incorporated in the casing of the PMG 15 that cools the generator by passing a cool liquid around the outside of the heat-producing mechanical components. The cool liquid enters the PMG 15 through the inlet connector 175 and exits the system through the outlet connector 174, where the now hot liquid is passed through a heat exchanger to remove the heat energy and recycle the liquid back through the water jacket incorporated within the casing of the PMG 15. In this manner, the heat energy extracted by the heat exchanger is recovered back into the SES system. The PMG 15 is installed into a frame and anchored in position via the fixing plate 176.

Figure 21:
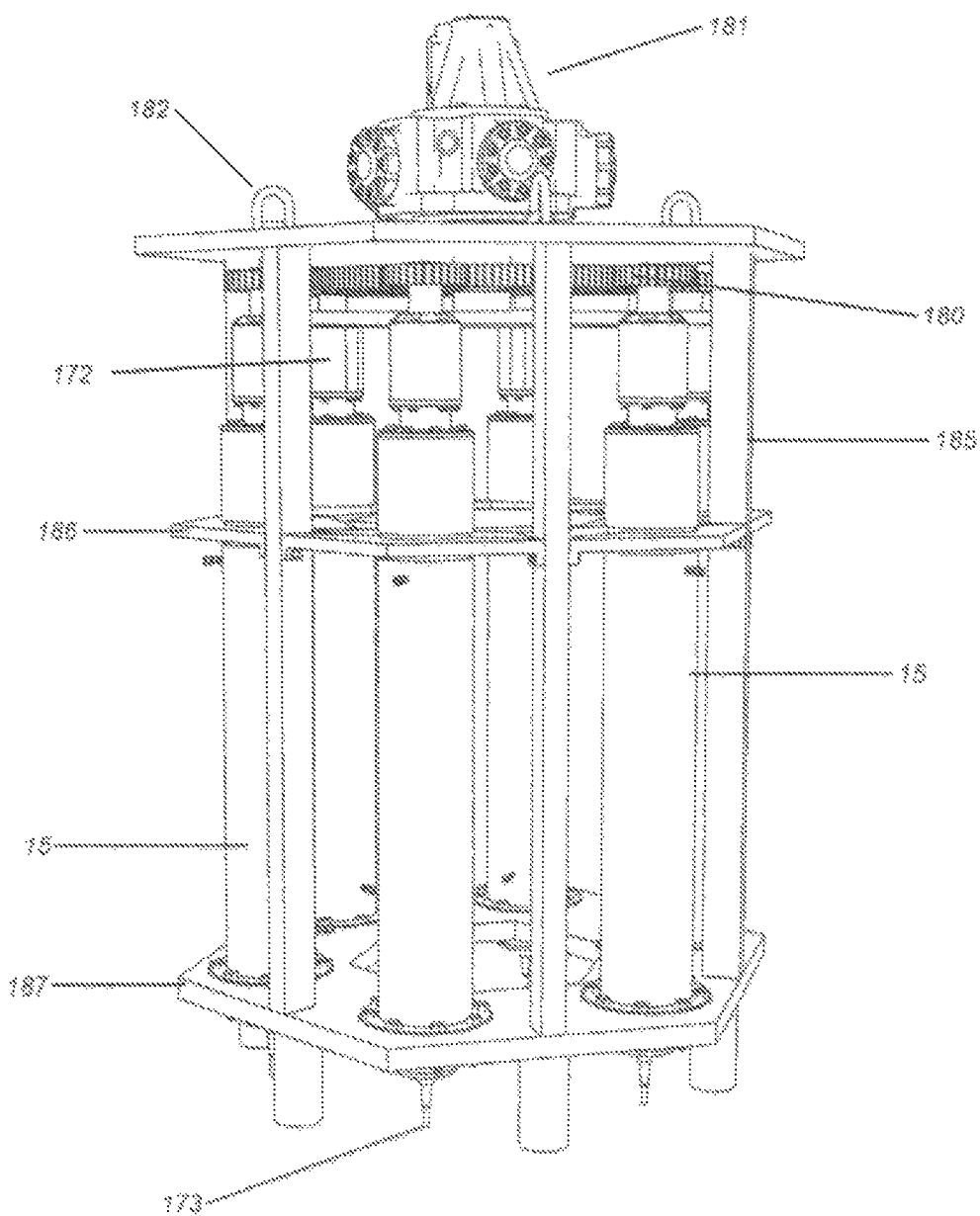
FIG. 21 is a perspective view of the modular generator cluster and hydraulic drive system of the present invention shown with an installation frame.

FIG. 21 is a perspective view of the modular generator cluster and hydraulic drive system of the present invention shown with an installation frame. This figure illustrates how a cluster of multiple PMGs 15 operates and how the individual PMGs are fitted into the generator cluster frame 185. In this example, the PMGs are driven by a single large hydraulic motor 181 at the top of the generator cluster frame 185.

The hydraulic motor 181 rotates the generator cluster drive gear 180 on the underside of the top section of the frame 185. The generator cluster drive gear 180 spins and in turn rotates the PMM generator electromagnetic couplings 172 at the top of the PMG 15. The CCU (see FIG. 1, reference number 37) monitors the hydraulic pressure at the hydraulic motor 181 and calculates how many of the PMGs 15 can be activated to generate electricity. The CCU switches the individual PMG electromagnetic couplings 172 on or off depending on the available hydraulic pressure. When the electromagnetic coupling 172 is switched off, the drag or friction from the PMG 15 is removed completely from the drive system to improve the efficiency of the energy output from the available hydraulic pressure. When the available energy to drive the generators is low, the CCU activates a small number of generators, and when the available energy is high, the CCU activates all of the PMGs in the cluster.

The PMG switching system enables the individual generators 15 to be replaced or serviced without the need to shut down the SES, thereby avoiding any down time. The generator cluster frame 185 is designed to allow any individual generator to be removed and replaced as quickly as possible. Each PMG 15 has a separate retaining bracket 186 that is held in place by two bolts, and the bottom of the PMG 15 is bolted to the lower section of the frame 187. The PMG cluster is designed to be modular so that additional units may be added or subtracted as energy demand is in increased or decreased.

Prior art large wind turbines of 500 kilowatts to three megawatts in size generally produce their optimum energy output at a wind speed of 35 miles per hour. Once the wind turbine reaches its optimum operating speed, it will then produce the same electrical output up to the wind speed at which it switches off, which is generally between 50 and 55 miles per hour in the case of a 3-MW wind turbine, so that a 3-MW wind turbine produces 3 MW at 35 miles per hour and 3 MW at 50 miles per hour. The present invention does not cease to produce excess energy at any given wind speed; instead, it produces a higher electrical output at higher wind speeds. For example, the wind turbine of the present invention will produce three megawatts of electrical output at a wind speed of 35 miles per hour, six megawatts of electrical energy at 45 miles per hour, and 12 megawatts of electrical energy at 55 miles per hour. This is because the present invention does not require the rotor blades to be braked or slowed down until the wind speed is in excess of fifty-five (55) miles per hour and also because the SES uses multiple generators to capture all of the available wind energy. Because the available energy from the wind increases by two-fold with each 10-mile-per-hour increase in wind speed, a prior art wind turbine that produces three megawatts at thirty (30) miles per hour should produce six megawatts at forty-five (45) miles per hour but actually only produces three megawatts. This means that prior art wind turbines can waste as much energy as they produce in wind speeds above forty (40) miles per hour.

At the top of each frame are four lifting hooks 182 to allow complete generator clusters to lifted and moved.

Because the high-voltage direct current generators are decoupled from the wind turbines, they can be driven by additional forms of power such as photovoltaic, natural gas or coal.

Figure 22:
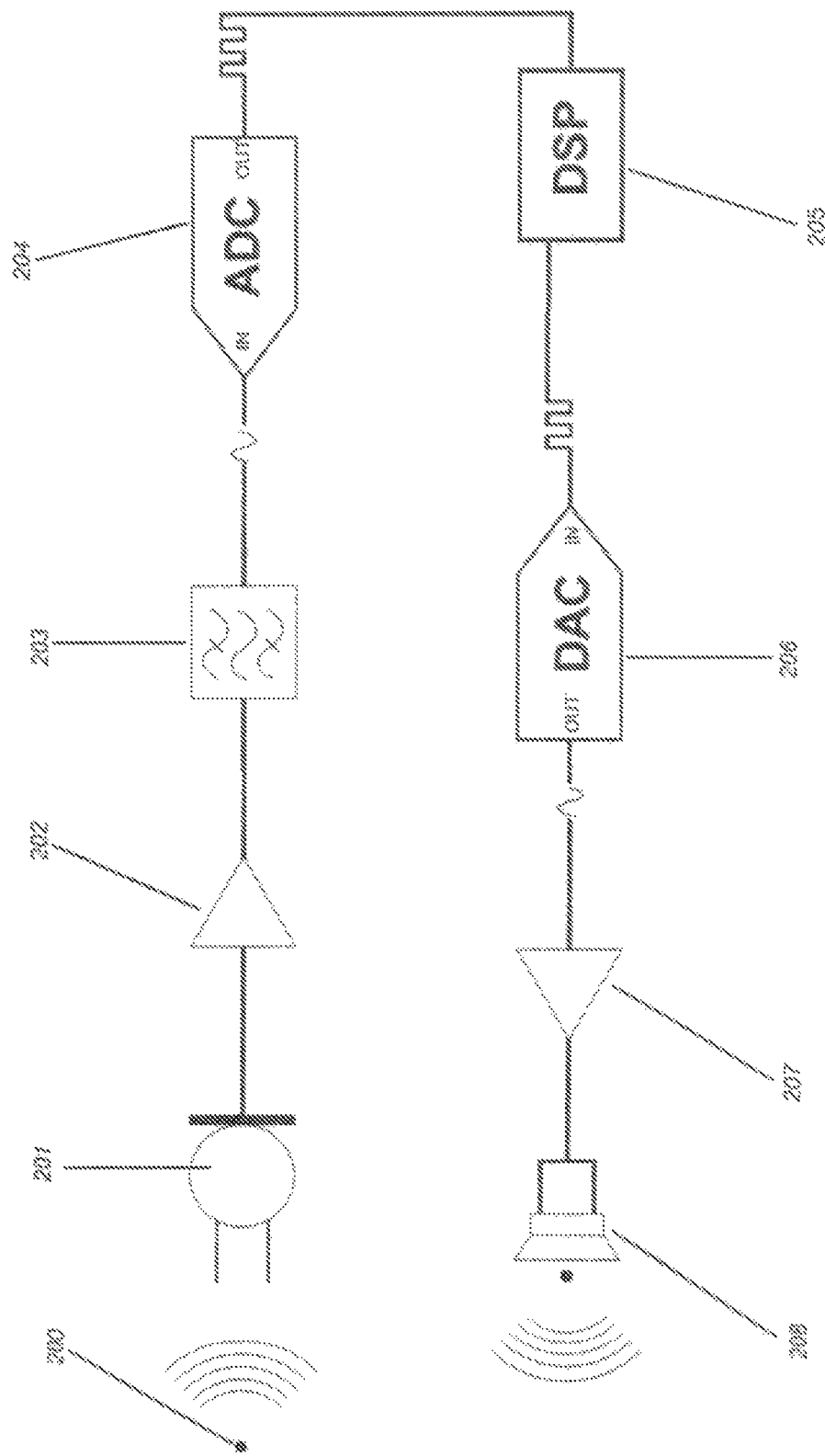
FIG. 22 is a schematic diagram of the bat deterrent system of the present invention.

FIG. 22 is a schematic diagram of the bat deterrence system of the present invention. Bats are frequently killed by open rotor wind turbines either from colliding with the rotor blades or flying into the area of low pressure behind the rotor blades. The sudden drop in air pressure can cause the lungs of the bat to collapse, killing the animal. A bat uses echolocation to navigate by emitting ultrasonic sounds that bounce off solid objects to create an echo. By comparing the outgoing pulse with the returning echo, the bat's brain and auditory nervous system produce an image of the bat's surrounding for navigation. Each bat produces its own unique sonic pulse signal that allows it to identify its own signal even in a cave containing thousands of other bats.

The bat deterrence system shown in FIG. 22 is preferably attached to the areas of the turbine 2 that bats need to avoid (specifically, the rear areas of the turbine 2). This system captures the bat's unique signal and fires it back at the bat, making it believe that there is a large solid object in its immediate path and it must change direction to avoid it. The signal can be delayed and timed to go in between the natural reflecting pulses of an existing solid object (such as the wind turbine) to make the object appear closer to the bat or simply fired back in rapid succession to make an empty section of air appear solid to the bat. In this manner, the area of low pressure behind the wind turbine can be kept clear of bats to avoid harm falling upon the animal.

The unique sonic bat signal 200 is received by the microphone 201 and passed through a pre-amplifier 202 to boost the signal. The signal is then passed through a low-pass filter 203 to remove unwanted frequencies, leaving only the bat sonic frequencies, before being converted from an analog signal into a digital signal 204. A digital sound processor 205 amends the signal to the required output (in this example, to make the bat believe the empty low-pressure area behind the turbine is solid) before passing it through a digital-to-analog converter 206 to turn the signal back into an analog sound. The sound is then put through an amplifier 207 to boost the signal ready for transmission through the speaker 208. The bat deterrence system can be used in any application than has a requirement to keep bats away from a location without inflicting harm on the bats.

Figure 23A:
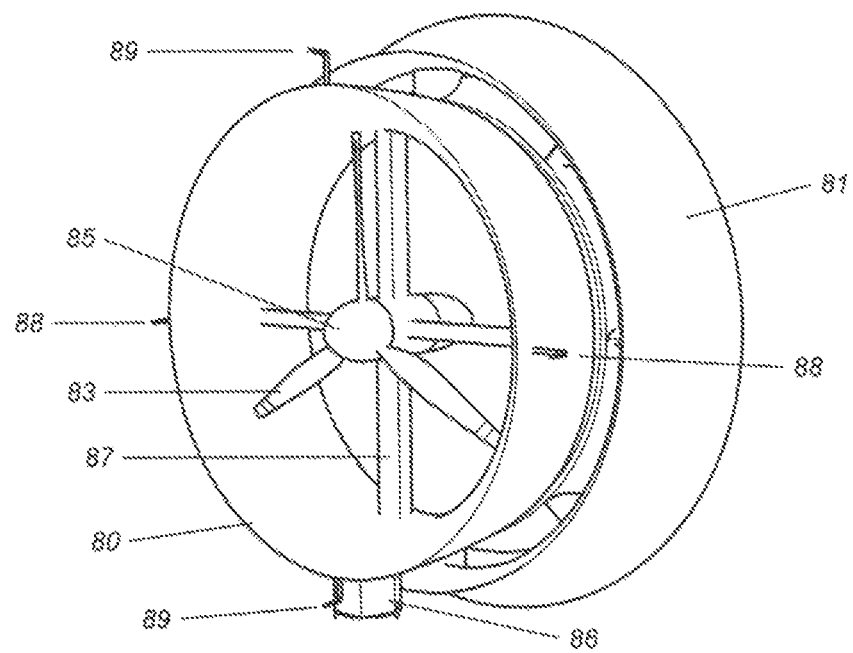
FIG. 23a is a front perspective view of the ducted diffuser multiple rotor wind turbine nacelle and diffuser of the present invention with a single internal front rotor and no outer rotor.
Figure 23B:
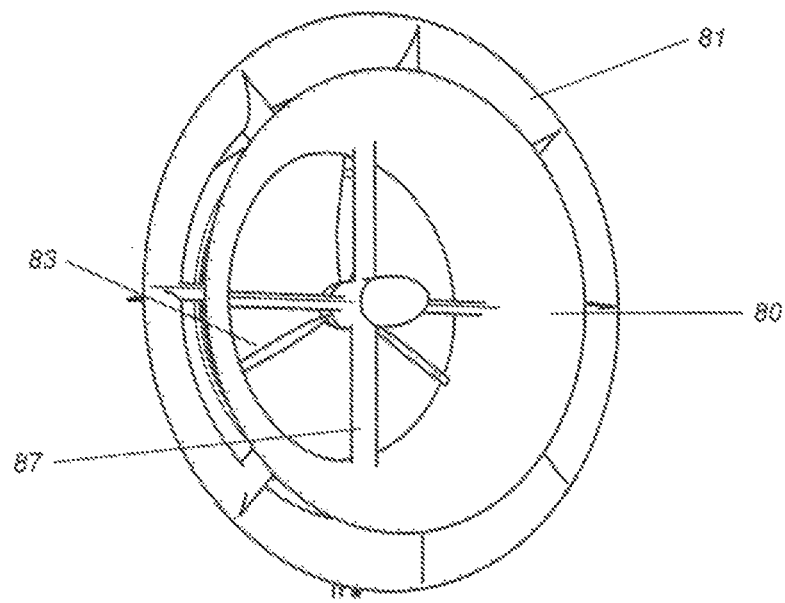
FIG. 23b is a rear perspective view of the ducted diffuser multiple rotor wind turbine nacelle and diffuser of the present invention with a single internal front rotor and no outer rotor.

FIGS. 23a-27 illustrate several alternate embodiments of the present invention. FIG. 23a is a front perspective view of the present invention with a single set of inner rotor blades 83 without the outer rotor blades 84 and air guides 85. The removal of the outer rotor blades 84, rear inner rotor blades 195 and the air guides 85 is to provide a simpler machine for those that require one. FIG. 23b is a rear perspective view of the embodiment shown in FIG. 23a.

Figure 24A:
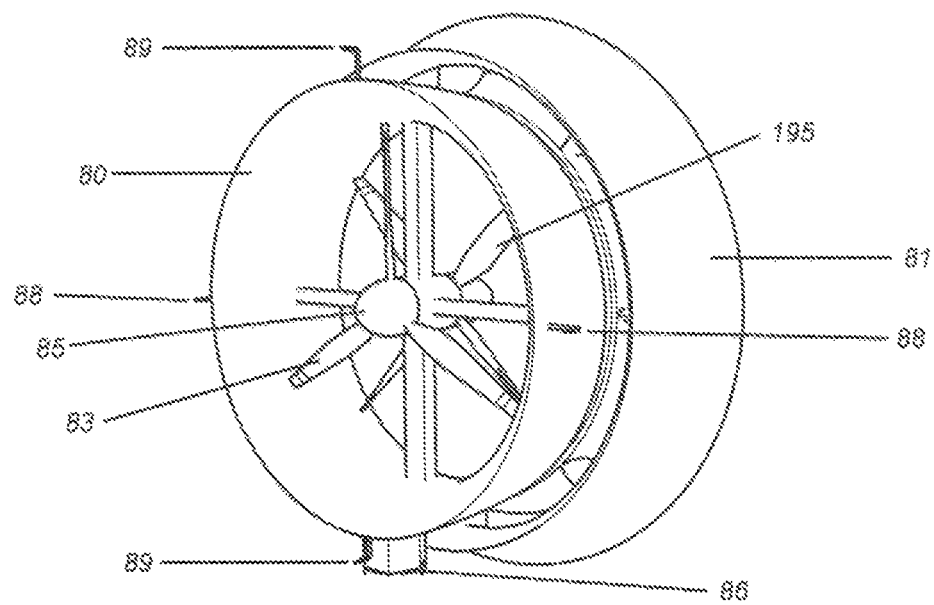
FIG. 24a is a front perspective view of the ducted diffuser multiple rotor wind turbine nacelle and diffuser of the present invention with two internal rotors and no outer rotor.
Figure 24B:
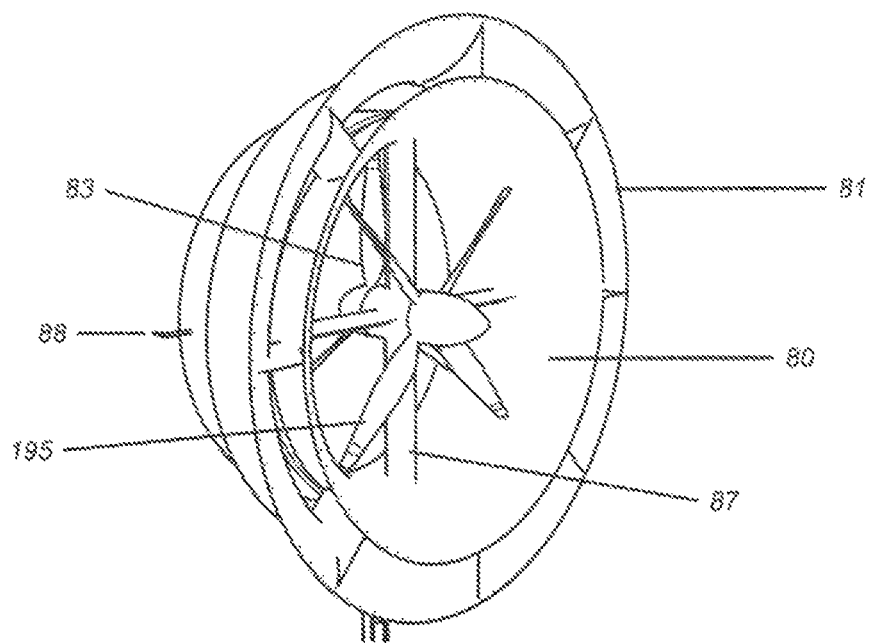
FIG. 24b is a rear perspective view of the ducted diffuser multiple rotor wind turbine nacelle and diffuser of the present invention with two internal rotors and no outer rotor.

FIG. 24a is a front perspective view of the present invention with a single set of front inner rotor blades 83 and a single set of rear inner rotor blades 195 without the outer rotor blade 84 and air guides 85. The removal of the outer rotor blades 84 and the air guides 85 is provide a simpler machine for those that require one. The rear inner rotor blades 195 can be either counter-rotating or rotate in the same direction as the front inner rotor blade 83. FIG. 24b is a rear perspective view of the embodiment shown in FIG. 24a.

Figure 25A:
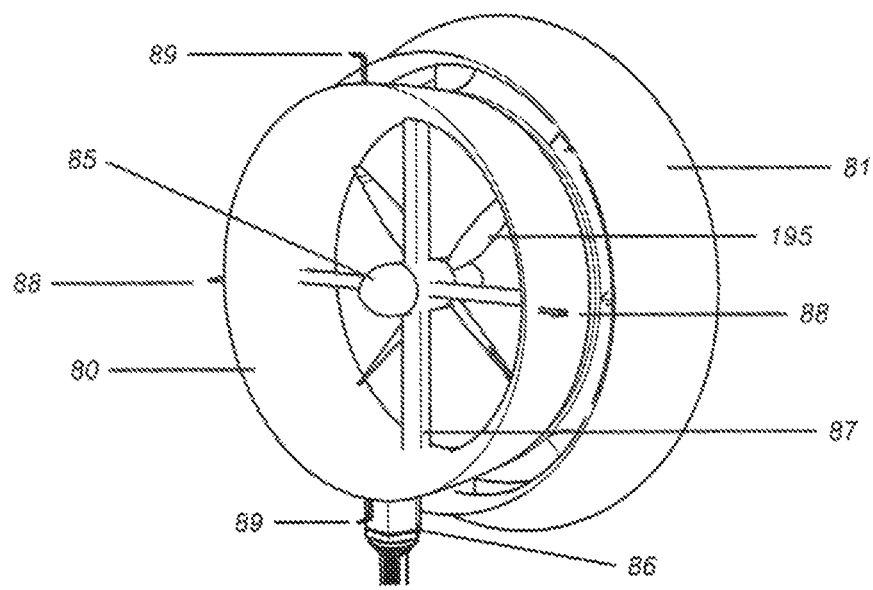
FIG. 25a is a front perspective view of the ducted diffuser multiple rotor wind turbine nacelle and diffuser of the present invention with a single internal rear rotor and no outer rotor.
Figure 25B:
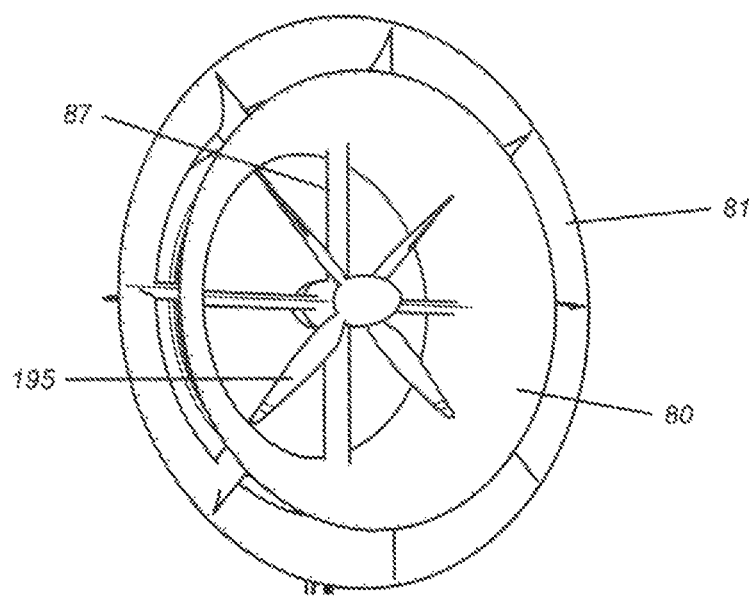
FIG. 25b is a rear perspective view of the ducted diffuser multiple rotor wind turbine nacelle and diffuser of the present invention with a single internal rear rotor and no outer rotor.

FIG. 25a is a front perspective view of the present invention with a single set of rear inner rotor blades 195 without the front inner rotor blades 83, outer rotor blades 84 and air guides 85. The removal of the outer rotor blades 84, front inner rotor blades 83 and the air guides 85 is to provide a simpler machine for those that require one; this embodiment is more efficient in high wind speeds than the embodiment shown in FIGS. 23a and 23b. FIG. 25b is a rear perspective view of the embodiment shown in FIG. 25a.

Figure 26A:
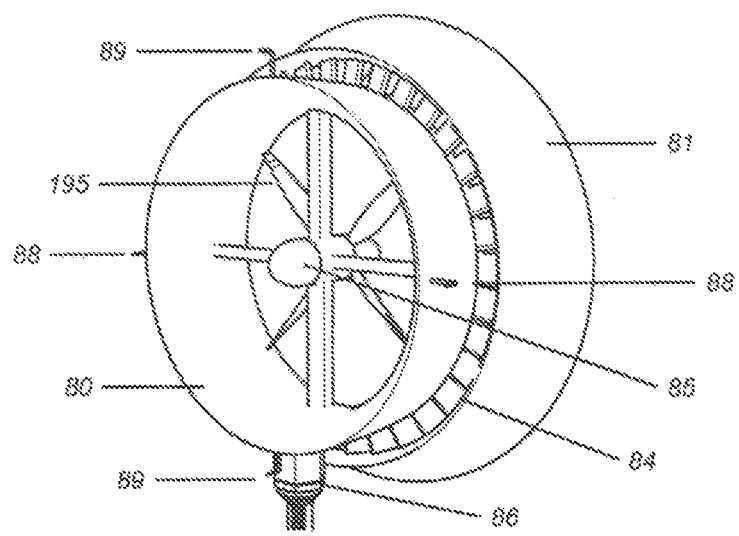
FIG. 26a is a front perspective view of the ducted diffuser multiple rotor wind turbine nacelle and diffuser of the present invention with a single internal rear rotor.
Figure 26B:
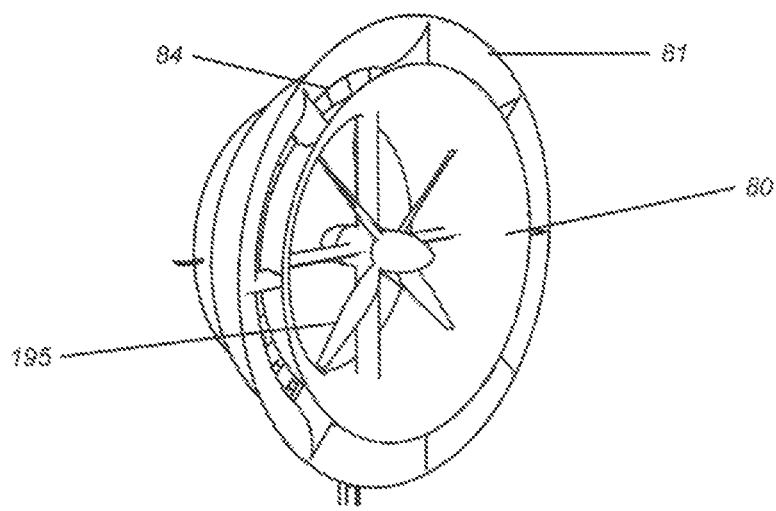
FIG. 26b is a rear perspective view of the ducted diffuser multiple rotor wind turbine nacelle and diffuser of the present invention with a single internal rear rotor.

FIG. 26a is a front perspective view of the present invention with a single set of rear inner rotor blades 195 without the front inner rotor blades 83 and air guides 85 but with a set of outer rotor blades 84. The removal of the front inner rotor blades 83 and the air guides 85 provides a system that is more efficient in high wind speeds than the embodiment shown in FIGS. 4a and 4b. FIG. 26b is a rear perspective view of the embodiment shown in FIG. 26a.

Figure 27:
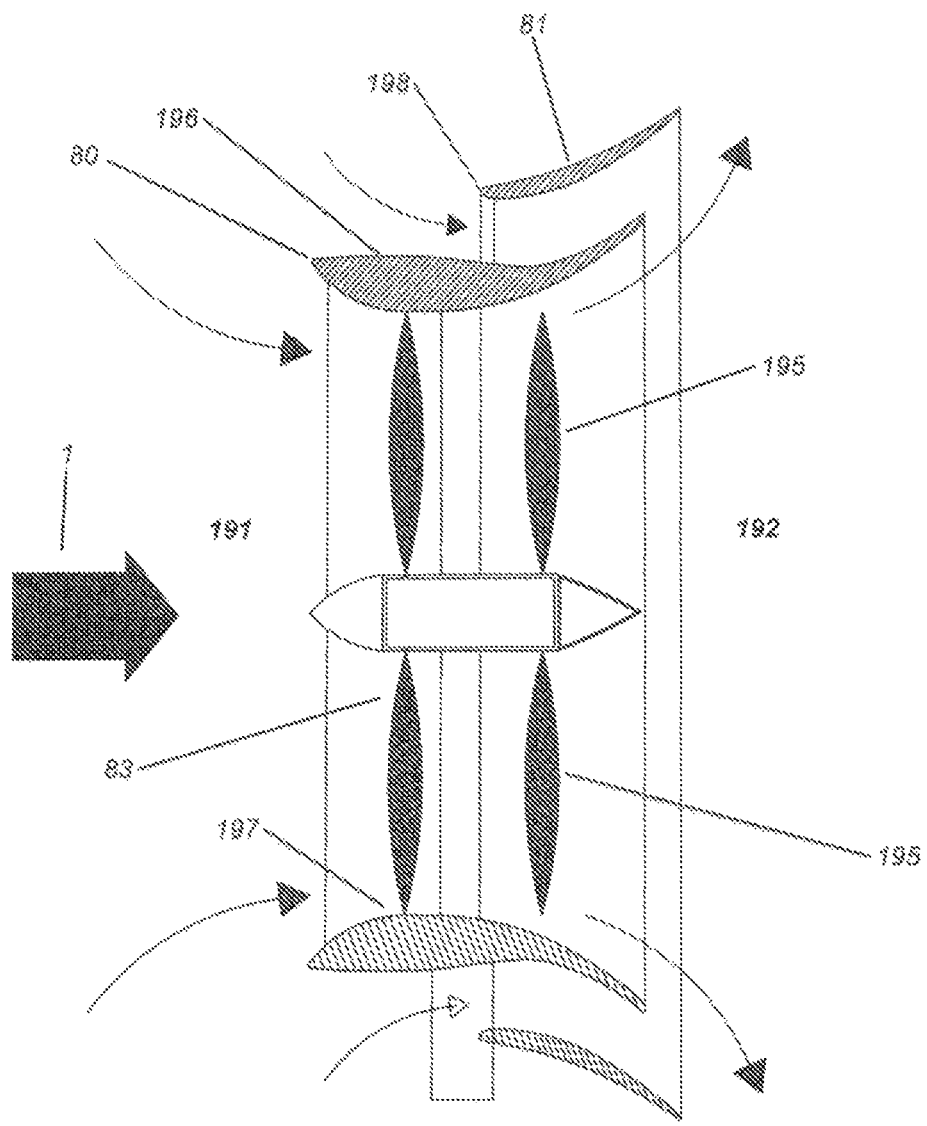
FIG. 27 is a side elevation cross-section view of the wind turbine of the present invention illustrating how air flows through the wind turbine without an outer rotor blade.

FIG. 27 is a side elevation cross-section view of the wind turbine of the present invention illustrating how air flows through the wind turbine without the outer rotor blades 84. The air flows from the front area 191 of the turbine to the rear area 192, as described in connection with FIG. 8. The space vacated by the removal of the outer rotor blade 84 allows the air to flow through the gap between the cowling outer surface 196 and the diffuser 81 without a reduction in air speed or velocity. The air flow is directed away from the rear area 192 of the turbine, which reduces the air pressure directly behind the turbine in the rear area 192. The reduction of the air pressure at the rear area 192 is purposely induced to create a difference in air pressure between the front area 191 and the rear area 192. This difference in air pressure forces the air through the cowling 80 and over the cowling inner surface 197.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A wind energy system comprising:
   (a) a wind turbine comprising a cowling surrounded by a diffuser;
   (b) a plurality of inner rotor blades located inside of the cowling, wherein the plurality of inner rotor blades rotates about an inner rotor hub;
   (c) a plurality of outer rotor blades positioned between the diffuser and the cowling, wherein the plurality of outer rotor blades rotate in an opposite direction to that of the plurality of inner rotor blades;
   (d) a drive mechanism located within the inner rotor hub;
   (e) a dynamic telescopic tower with a height that adjusts automatically by motors controlled by a controller based on input from sensors located in the dynamic telescopic tower and on the wind turbine; and
   (f) a tower support that connects the wind turbine to the dynamic telescopic tower.

2. The wind energy system of claim 1, further comprising a plurality of air guides located inside of the cowling and in front of the inner rotor blades.

3. The wind energy system of claim 1, wherein the outer rotors rotate around the cowling on roller bearings.

4. The wind energy system of claim 1, further comprising two horizontal wind speed sensors and two vertical wind speed sensors situated on an outer surface of the cowling forward of the diffuser, wherein the two horizontal wind speed sensors are situated opposite one another on a horizontal plane, and the two vertical wind speed sensors are situated opposite one another on a vertical plane, wherein the two horizontal wind speed sensors are situated on an adjacent side of the cowling relative to the two vertical wind speed sensors, wherein each of the horizontal wind speed sensors and each of the vertical wind speed sensors records a wind speed, wherein a computer control unit compares the wind speeds recorded by the two horizontal wind speed sensors and turns the turbine via a three-dimensional yaw control toward the horizontal wind speed sensor that records a lower wind speed than the other horizontal wind speed sensor, and wherein the computer control unit compares the wind speeds recorded by the two vertical wind speed sensors and turns the turbine via a three-dimensional yaw control toward the vertical wind speed sensor that records a lower wind speed than the other vertical wind speed sensor.

5. The wind energy system of claim 1, wherein the cowling and diffuser each comprises an exhaust with an inner diameter and an inlet with an inner diameter, and wherein the inner diameter of the exhaust of the cowling is greater than the inner diameter of the inlet of the cowling, and the inner diameter of the exhaust of the diffuser is greater than the inner diameter of the inlet of the diffuser.

6. The wind energy system of claim 1, wherein the cowling and diffuser each comprises a rear edge, wherein the rear edges of the cowling and diffuser are aligned vertically, wherein the cowling extends a certain length from the rear edge of the cowling to a front edge of the cowling, wherein the diffuser extends a certain length from the rear edge of the diffuser to a front edge of the diffuser, and wherein the certain length of the diffuser is equal to approximately half the certain length of the cowling.

7. The wind energy system of claim 1, wherein the inner rotor blades are connected to a first drive shaft, wherein the first drive shaft is connected to the inner rotor hub, wherein the first drive shaft rotates a first gear, wherein the first gear is connected to a plurality of first variable displacement hydraulic pumps that pump a pressurized liquid through a high-pressure hydraulic circuit, wherein each of the plurality of first variable displacement hydraulic pumps is connected to the first gear by a first electromagnetic coupling, and wherein the first electromagnetic coupling is controlled by a power control unit that processes information from a speed sensor located on the first drive shaft.

8. The wind energy system of claim 1, wherein the inner rotor blades are connected to a first drive shaft, wherein the first drive shaft is connected to the inner rotor hub, wherein the first drive shaft rotates a first gear, wherein the first gear is connected to a plurality of first variable displacement hydraulic pumps that pump a pressurized liquid through a high-pressure hydraulic circuit, wherein each of the plurality of first variable displacement hydraulic pumps is connected to the first gear by a first electromagnetic coupling, and wherein the first electromagnetic coupling is controlled by a power control unit that processes information from a torque sensor located on the first drive shaft.

9. The wind energy system of claim 7 or 8, further comprising a ring gear that rotates when the plurality of outer rotor blades rotates, wherein the ring gear engages an outer rotor drive gear, wherein the outer rotor drive gear is connected to a second drive shaft, wherein the second drive shaft is connected to a second gear, wherein the second gear drives a plurality of second electromagnetic couplings, and wherein each of the plurality of second electromagnetic couplings is connected to a second variable displacement hydraulic pump.

10. The wind energy system of claim 9, wherein the sensors include sensors that monitor rotational speed of the first gear and second gear, wherein the dynamic telescopic tower positions the wind turbine at a height, wherein the dynamic telescopic tower comprises one or more load sensors, and wherein a computer control unit automatically adjusts the height of the wind turbine based on data from the one or more sensors that monitor the rotational speed of the first gear and second gear and the one or more load sensors in the dynamic telescopic tower.

11. The wind energy system of claim 1, wherein the inner rotor blades are connected to a first drive shaft, wherein the first drive shaft is connected to the inner rotor hub, wherein the first drive shaft rotates a first gear, wherein the first gear is connected to a plurality of first air compressors that pump a pressurized fluid through a high-pressure pneumatic circuit, wherein each of the plurality of first air compressors is connected to the first gear by a first electromagnetic coupling, and wherein the first electromagnetic coupling is controlled by a power control unit that processes information from a speed sensor located on the first drive shaft.

12. The wind energy system of claim 1, wherein the inner rotor blades are connected to a first drive shaft, wherein the first drive shaft is connected to the inner rotor hub, wherein the first drive shaft rotates a first gear, wherein the first gear is connected to a plurality of first air compressors that pump a pressurized fluid through a high-pressure pneumatic circuit, wherein each of the plurality of first air compressors is connected to the first gear by a first electromagnetic coupling, and wherein the first electromagnetic coupling is controlled by a power control unit that processes information from a torque sensor located on the first drive shaft.

13. The wind energy system of claim 11 or 12, further comprising a ring gear that rotates when the plurality of outer rotor blades rotates, wherein the ring gear engages an outer rotor drive gear, wherein the outer rotor drive gear is connected to a second drive shaft, wherein the second drive shaft is connected to a second gear, wherein the second gear drives a plurality of second electromagnetic couplings, and wherein each of the plurality of second electromagnetic couplings is connected to a second air compressor.

14. The wind energy system of claim 13, wherein the sensors include sensors that monitor rotational speed of the first gear and second gear, wherein the dynamic telescopic tower positions the wind turbine at a height, wherein the dynamic telescopic tower comprises one or more load sensors, and wherein a computer control unit automatically adjusts the height of the wind turbine based on data from the one or more sensors that monitor the rotational speed of the first gear and second gear and the one or more load sensors in the dynamic telescopic tower.

15. The wind energy system of claim 1, wherein energy is generated by wind with a mean direction, and wherein the dynamic telescopic tower comprises an integrated three-dimensional yaw control that aligns the wind turbine with the mean direction of the wind.

16. The wind energy system of claim 15, wherein the three-dimensional yaw control comprises a plurality of yaw horizontal drive motors attached to a horizontal yaw ring gear and a plurality of vertical yaw drives connected to a drive rail on a yaw control platform.

17. The wind energy system of claim 1, further comprising a bat deterrence system, wherein the bat deterrence system comprises a microphone, a pre-amplifier, a low-pass filter, an analog-to-digital converter, a digital sound processor, a digital-to-analog converter, an amplifier, and a speaker, and wherein the bat deterrence system is attached to the wind turbine.

18. The wind energy system of claim 1, further comprising a bat deterrence system, wherein the bat deterrence system comprises a microphone, a pre-amplifier, a low-pass filter, an analog-to-digital converter, a digital sound processor, a digital-to-analog converter, an amplifier, and a speaker, and wherein the bat deterrence system is attached to the dynamic telescopic tower.

19. The wind energy system of claim 7 or 8, further comprising one or more hydraulic accumulators that compress an inert gas and use the compressed inert gas to force the pressurized liquid through a controlled release valve and through high-pressure pipes to drive a hybrid variable displacement hydraulic pump.

20. The wind energy system of claim 19, wherein the hybrid variable displacement pump drives one or more ground-based multiple permanent magnet electrical generators to create electricity.

21. The wind energy system of claim 7 or 8, wherein each of the first variable displacement hydraulic pumps comprises a solenoid-operated bypass valve that diverts fluid flow through the first variable displacement hydraulic pump when the first variable displacement pump is not in use.

22. The wind energy system of claim 7 or 8, wherein the power control unit monitors data comprising wind speed, drive shaft speed and hydraulic pressure via electrical sensors and processes the data to determine how many first variable displacement hydraulic pumps need to be activated at any moment in time.

23. The wind energy system of claim 9, wherein the power control unit monitors data comprising wind speed, drive shaft speed and hydraulic pressure via electrical sensors and processes the data to determine how many second variable displacement hydraulic pumps need to be activated at any moment in time.

24. The wind energy system of claim 1, wherein when wind speed reaches a certain velocity, the dynamic telescopic tower is automatically lowered to a safe operating height without the inner and outer rotor blades being switched off.

25. The wind energy system of claim 1, wherein rotational speed of the rotor blades changes as wind velocity changes.

26. The wind energy system of claim 1, further comprising hydraulic accumulators that absorb fluctuating energy levels from wind, store excess energy, and supply a constant and controlled output to drive a plurality of permanent magnetic generators.

27. The wind energy system of claim 26, wherein the plurality of permanent magnetic generators are housed in modular generator clusters.

28. The wind energy system of claim 27, wherein the modular generator clusters switch on and off individually as and when demand is required.

29. The wind energy system of claim 26, wherein each permanent magnetic generator is driven by a generator drive gear, and wherein the generator drive gear turns a permanent magnetic generator coupling that spins a drive in the permanent magnetic generator without a direct mechanical linkage.

30. The wind energy system of claim 26, wherein each permanent magnetic generator comprises a water jacket that cools the permanent magnetic generator by passing a cool liquid around heat-producing mechanical components.

31. The wind energy system of claim 29, wherein a computer control unit monitors hydraulic pressure at a hydraulic motor that drives the generator drive gear, calculates how many permanent magnetic generators to activate to generate electricity, and switches individual permanent magnetic generator electromagnetic couplings on or off depending on available hydraulic pressure.

32. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotates in the same direction as the plurality of first inner rotor blades;
(d) a plurality of outer rotor blades positioned between the diffuser and the cowling, wherein the plurality of outer rotor blades rotate in an opposite direction to that of the plurality of first and second inner rotor blades;
(e) a drive mechanism located within the inner rotor hub;
(f) a dynamic telescopic tower with a height that adjusts automatically by motors controlled by a controller based on input from sensors located in the dynamic telescopic tower and on the wind turbine; and
(g) a tower support that connects the wind turbine to the dynamic telescopic tower.

33. A method of mining metals comprising:
(a) using the wind energy system of claim 1 to generate energy;
(b) passing a slurry through an electrochemical ion transfer desalination process to remove precious metals from the slurry and produce hydrogen gas and oxygen;
(c) producing potable water by removing metals and contaminants from the slurry; and
(d) storing the hydrogen gas and oxygen produced during the desalination process in pressurized containers.

34. A wind energy system comprising:
(a) a wind turbine comprising a cowling surrounded by a diffuser;
(b) a plurality of inner rotor blades located inside of the cowling, wherein the plurality of inner rotor blades rotates about an inner rotor hub;
(c) a plurality of outer rotor blades positioned between the diffuser and the cowling, wherein the plurality of outer rotor blades rotate in an opposite direction to that of the plurality of inner rotor blades;
(d) a drive mechanism located within the inner rotor hub;
(e) a dynamic telescopic tower with a height that adjusts automatically by motors controlled by a controller based on input from sensors located in the dynamic telescopic tower and on the wind turbine;
(f) a tower support that connects the wind turbine to the dynamic telescopic tower; and
(g) one or more hydraulic accumulators that compress a gas and use the compressed gas to force a pressurized liquid through a controlled release valve and through high-pressure pipes to drive a hybrid variable displacement hydraulic pump.

35. A wind energy system comprising:
(a) a wind turbine comprising a cowling surrounded by a diffuser;
(b) a plurality of first inner rotor blades located inside of the cowling, wherein the plurality of first inner rotor blades rotates about a first inner rotor hub;
(c) a plurality of second inner rotor blades located inside of the cowling and behind the plurality of first inner rotor blades, wherein the plurality of second inner rotor blades rotate in an opposite direction to that of the plurality of first inner rotor blades;
(d) a plurality of outer rotor blades positioned between the diffuser and the cowling, wherein the plurality of outer rotor blades rotate in an opposite direction to that of the plurality of second inner rotor blades;

(e) a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure;

(f) a dynamic telescopic tower with a height that adjusts automatically by motors controlled by a controller based on input from sensors located in the dynamic telescopic tower and on the wind turbine; and (g) a tower support that connects the wind turbine to the dynamic telescopic tower.

36. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotate in an opposite direction to that of the plurality of first inner rotor blades;
(d) a plurality of outer rotor blades positioned between the diffuser and the cowling, wherein the plurality of outer rotor blades rotates in the same direction as the second inner rotor blades;
(e) a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure;
(f) a dynamic telescopic tower with a height that adjusts automatically by motors controlled by a controller based on input from sensors located in the dynamic telescopic tower and on the wind turbine; and
(g) a tower support that connects the wind turbine to the dynamic telescopic tower.

37. A wind energy system comprising:
(a) a wind turbine comprising a cowling surrounded by a diffuser;
(b) a plurality of inner rotor blades located inside of the cowling, wherein the plurality of inner rotor blades rotates about a first inner rotor hub;
(c) a drive mechanism located within the inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure;
(d) a dynamic telescopic tower with a height that adjusts automatically by motors controlled by a controller based on input from sensors located in the dynamic telescopic tower and on the wind turbine; and
(e) a tower support that connects the wind turbine to the dynamic telescopic tower.

38. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotate in an opposite direction to that of the plurality of first inner rotor blades;
(d) a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure;
(e) a dynamic telescopic tower with a height that adjusts automatically by motors controlled by a controller based on input from sensors located in the dynamic telescopic tower and on the wind turbine; and
(f) a tower support that connects the wind turbine to the dynamic telescopic tower.

39. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotates in the same direction as the plurality of first inner rotor blades;
(d) a drive mechanism located within the first inner rotor hub, wherein the drive mechanism drives a gear that drives multiple hydraulic pumps, and wherein the drive mechanism comprises an electromagnetic coupling that couples and decouples the hydraulic pumps from the gear, thereby allowing individual hydraulic pumps to be turned on or off depending on available wind speed and hydraulic pressure;
(e) a dynamic telescopic tower with a height that adjusts automatically by motors controlled by a controller based on input from sensors located in the dynamic telescopic tower and on the wind turbine; and
(f) a tower support that connects the wind turbine to the dynamic telescopic tower.

40. A wind energy system comprising:
(a) a wind turbine comprising a cowling surrounded by a diffuser;
(b) a plurality of first inner rotor blades located inside of the cowling, wherein the plurality of first inner rotor blades rotates about a first inner rotor hub;
(c) a plurality of second inner rotor blades located inside of the cowling and behind the plurality of first inner rotor blades, wherein the plurality of second inner rotor blades rotate in an opposite direction to that of the plurality of first inner rotor blades;
(d) a plurality of outer rotor blades positioned between the diffuser and the cowling, wherein the plurality of outer rotor blades rotate in an opposite direction to that of the plurality of second inner rotor blades;
(e) a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure;

(f) a dynamic telescopic tower with a height that adjusts automatically by motors controlled by a controller based on input from sensors located in the dynamic telescopic tower and on the wind turbine; and (g) a tower support that connects the wind turbine to the dynamic telescopic tower.

41. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotate in an opposite direction to that of the plurality of first inner rotor blades;
(d) a plurality of outer rotor blades positioned between the diffuser and the cowling, wherein the plurality of outer rotor blades rotates in the same direction as the second inner rotor blades;
(e) a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure;
(f) a dynamic telescopic tower with a height that adjusts automatically by motors controlled by a controller based on input from sensors located in the dynamic telescopic tower and on the wind turbine; and
(g) a tower support that connects the wind turbine to the dynamic telescopic tower.

42. A wind energy system comprising:
(a) a wind turbine comprising a cowling surrounded by a diffuser;
(b) a plurality of inner rotor blades located inside of the cowling, wherein the plurality of inner rotor blades rotates about a first inner rotor hub;
(c) a drive mechanism located within the inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure;
(d) a dynamic telescopic tower with a height that adjusts automatically by motors controlled by a controller based on input from sensors located in the dynamic telescopic tower and on the wind turbine; and
(e) a tower support that connects the wind turbine to the dynamic telescopic tower.

43. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotate in an opposite direction to that of the plurality of first inner rotor blades;
(d) a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure;
(e) a dynamic telescopic tower with a height that adjusts automatically by motors controlled by a controller based on input from sensors located in the dynamic telescopic tower and on the wind turbine; and
(f) a tower support that connects the wind turbine to the dynamic telescopic tower.

44. A wind energy system comprising:
(a) a wind turbine comprising a cowling surrounded by a diffuser;
(b) a plurality of first inner rotor blades located inside of the cowling, wherein the plurality of inner rotor blades rotates about a first inner rotor hub;
(c) a plurality of second inner rotor blades located inside of the cowling and behind the plurality of first inner rotor blades, wherein the plurality of second inner rotor blades rotates in the same direction as the plurality of first inner rotor blades;
(d) a drive mechanism located within the first inner rotor hub, wherein the drive mechanism drives a gear that drives multiple pneumatic pumps, and wherein the drive mechanism comprises an electromagnetic coupling that couples and decouples the pneumatic pumps from the gear, thereby allowing individual pneumatic pumps to be turned on or off depending on available wind speed and pneumatic pressure;
(e) a dynamic telescopic tower with a height that adjusts automatically by motors controlled by a controller based on input from sensors located in the dynamic telescopic tower and on the wind turbine; and
(f) a tower support that connects the wind turbine to the dynamic telescopic tower.

\* \* \* \* \*